US006289418B1

(12) United States Patent
Koppala

(10) Patent No.: US 6,289,418 B1
(45) Date of Patent: *Sep. 11, 2001

(54) ADDRESS PIPELINED STACK CACHING METHOD

(75) Inventor: Sailendra Koppala, Mountain View, CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/829,105

(22) Filed: Mar. 31, 1997

(51) Int. Cl.$^7$ ................................................ G06F 12/08
(52) U.S. Cl. ........................... 711/132; 711/169; 711/220
(58) Field of Search ................................... 711/154, 220, 711/169, 132, 3; 365/189.04; 395/566, 182.19, 378

(56) References Cited

U.S. PATENT DOCUMENTS

| 3,810,117 | 5/1974 | Healey | 711/3 |
| 3,878,513 | * 4/1975 | Werner | 711/154 |
| 3,889,243 | 6/1975 | Drimak | 711/132 |

(List continued on next page.)

OTHER PUBLICATIONS

Eletronic Engineering, vol. 61, No. 750, Jun. 1989, p. 79, XP000033120, "Up Pops A 32Bit Stack Microprocessor."

Atkinson, R.R., et al., "The Dragon Processor", Second International Conference on Architectural Support for Programming Languages and Operating Systems, No. 1987, Oct. 5, 1987, pp. 65–69, XP000042867.

Stanley, et al., "A Performance Analysis of Automatically Managed Top of Stack Buffers", 14th Annual International Symposium on Computer Architecture, Jun. 2, 1987, pp. 272–281, XP002032257.

Burnley, P: "CPU Architecture for Realtime VME Systems", Microprocessors and Microsystems, London, GB, vol. 12, No. 3; Apr. 1988; pp. 153–158; XP000002633.

Lopriore, L: "Line Fetch/Prefetch in a Stack Cache Memory",Microprocessors and Microsystems, vol. 17, No. 9, Nov. 1, 1993, pp. 547–555, XP00413173.

*Microsoft Press Computer Dictionary*, $2^{nd}$ Ed., p. 279, 1994.

*Primary Examiner*—Matthew Kim
*Assistant Examiner*—Fred F. Tzeng
(74) *Attorney, Agent, or Firm*—Gunnison McKay & Hodgson, L.L.P.; Forrest Gunnison

(57) ABSTRACT

The present invention uses a stack management unit including a stack cache to accelerate data retrieval from a stack and data storage into the stack. In one embodiment, the stack management unit includes a stack cache, a dribble manager unit, and a stack control unit. The dribble manager unit maintains a cached stack portion, typically a top portion of the stack in the stack cache. The stack cache includes a stack cache memory circuit, one or more read ports, and one or more write ports. The stack management unit also includes an address pipeline to transfer multiple data words by the spill control unit and the fill control unit to improve the throughput of spill and fill operations. When new data words are written to the top memory location of the stack, the optop pointer is incremented. If data words are read off the stack the optop pointer is decremented. During normal operations the dribble manager unit detects spill conditions and fill conditions. If a spill condition occurs, the dribble manager unit spills a plurality of data words from the stack cache to the stack. If a fill condition occurs, the dribble manager unit fills a plurality of data words from the stack to the stack cache.

27 Claims, 13 Drawing Sheets

Microfiche Appendix Included
(1 Microfiche, 27 Pages)

U.S. PATENT DOCUMENTS

| | | | |
|---|---|---|---|
| 3,924,245 | 12/1975 | Eaton et al. | 711/219 |
| 4,268,903 * | 5/1981 | Miki et al. | 711/220 |
| 4,354,232 | 10/1982 | Ryan | 711/118 |
| 4,375,678 * | 3/1983 | Krebs, Jr. | 365/189.04 |
| 4,524,416 | 6/1985 | Stanley et al. | 711/200 |
| 4,530,049 | 7/1985 | Zee | 711/132 |
| 4,600,986 * | 7/1986 | Sheuneman et al. | 711/169 |
| 4,674,032 * | 6/1987 | Michaelson | 711/169 |
| 4,761,733 | 8/1988 | McCrocklin et al. | 711/212 |
| 4,811,208 | 3/1989 | Myers et al. | 711/132 |
| 4,951,194 | 8/1990 | Bradley et al. | 711/132 |
| 5,043,870 | 8/1991 | Ditzel et al. | 711/132 |
| 5,093,777 | 3/1992 | Ryan | 711/3 |
| 5,107,457 * | 4/1992 | Hayes et al. | 711/132 |
| 5,142,635 * | 8/1992 | Saini | 395/566 |
| 5,157,777 | 10/1992 | Lai et al. | 711/202 |
| 5,210,874 | 5/1993 | Karger | 709/328 |
| 5,485,572 * | 1/1996 | Overly | 395/182.19 |
| 5,535,350 * | 7/1996 | Maemura | 711/3 |
| 5,603,006 | 2/1997 | Satake et al. | 711/132 |
| 5,634,027 * | 5/1997 | Saito | 711/3 |
| 5,636,362 | 6/1997 | Stone et al. | 711/129 |
| 5,687,336 * | 11/1997 | Shen et al. | 395/378 |
| 5,784,553 | 7/1998 | Kolawa et al. | 714/38 |

* cited by examiner

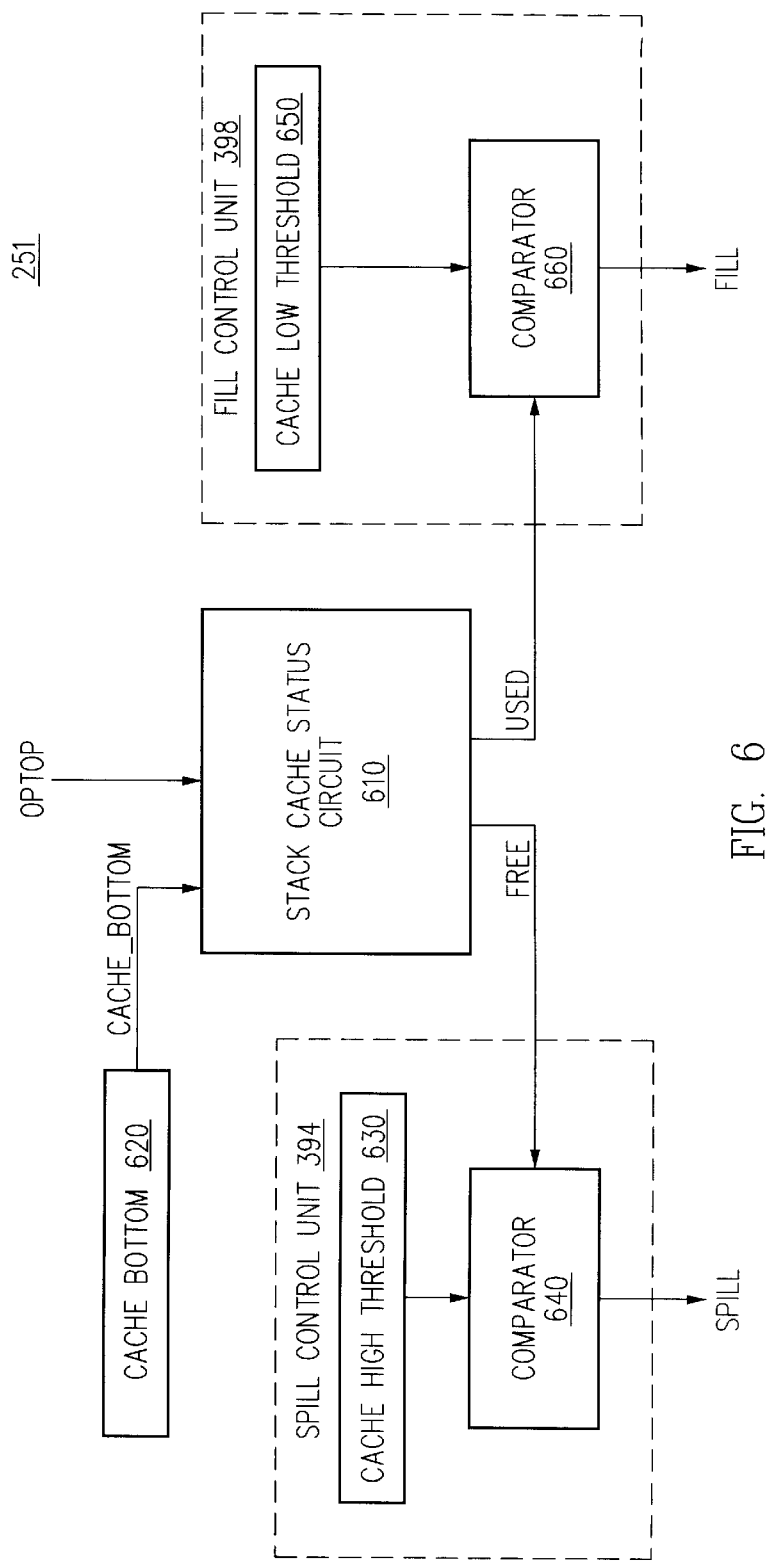
FIG. 5
FIG. 6

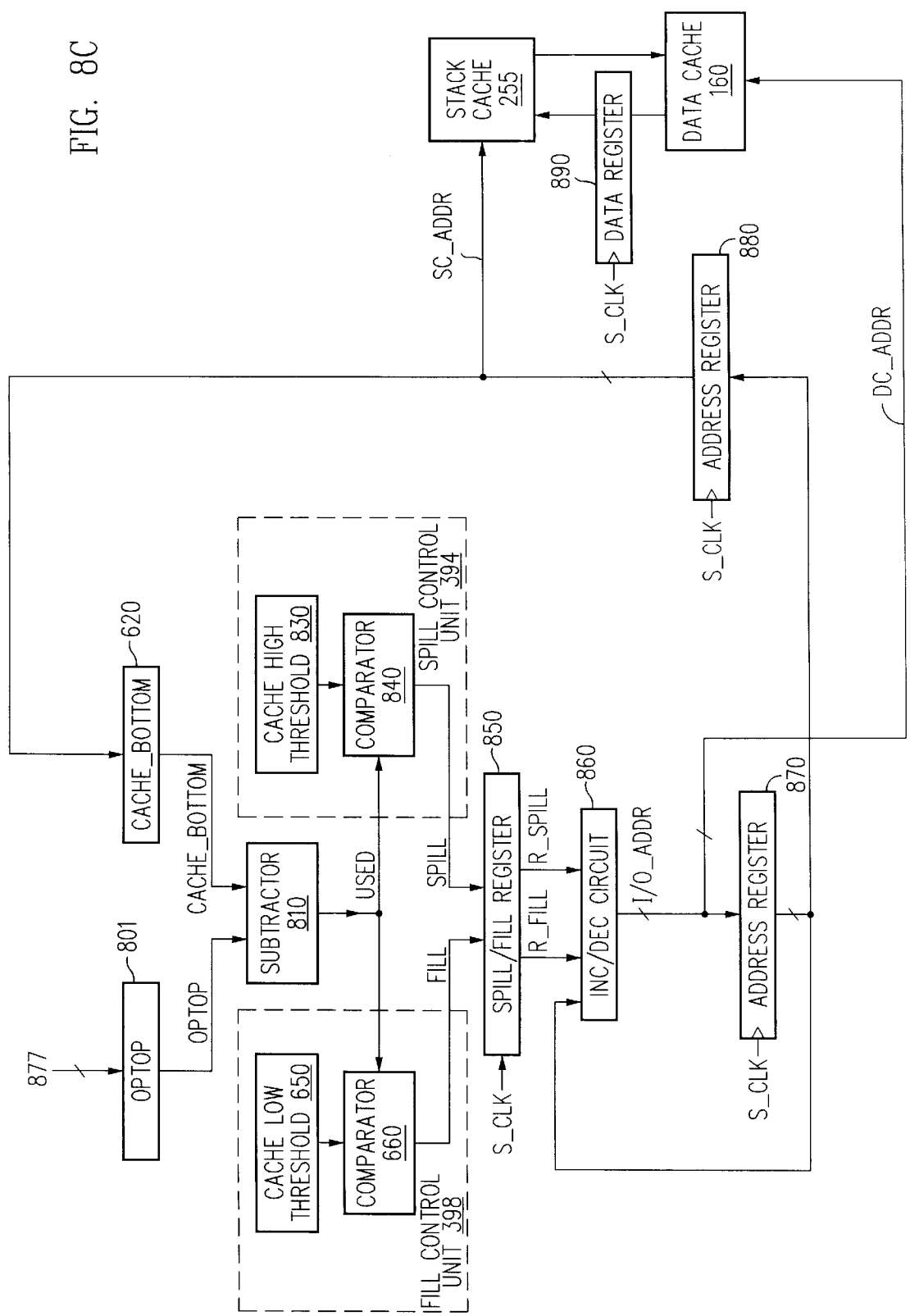

ADDRESS PIPELINED STACK CACHING METHOD

CROSS-REFERENCE TO RELATED APPLICATIONS

This application relates to the co-pending application Ser. No. 08/831,279, filed Mar. 31, 1997, entitled "PIPELINED STACK CACHING CIRCUIT", by Koppala, owned by the assignee of this application and incorporated herein by reference which is now patented. The patent number is U.S. Pat. No. 6,009,499.

This application also relates to the co-pending application Ser. No. 08/828,899, which now patented with U.S. Pat. No. 6,167,488, filed Mar. 31, 1997, entitled "STACK CACHING CIRCUIT WITH OVERFLOW/UNDERFLOW UNIT", by Koppala, owned by the assignee of this application and incorporated herein by reference.

This application also relates to the co-pending application Ser. No. 08/828,769, which now patented with U.S. Pat. No. 6,131,144, filed Mar. 31, 1997, entitled "STACK CACHING METHOD WITH OVERFLOW/UNDERFLOW CONTROL", by Koppala, owned by the assignee of this application and incorporated herein by reference.

CROSS REFERENCE TO MICROFICHE APPENDIX A

Appendix A, which is a part of the present disclosure, is a microfiche appendix consisting of one sheet of microfiche having a total of 27 frames. Microfiche Appendix A, is a listing of Verilog code for embodiments of components of this invention, which are described more completely below.

A portion of the disclosure of this patent document including Microfiche Appendix A, contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

1. Field of the Invention

The present invention relates generally to computer systems and, in particular, to caching of stack memory architectures.

2. Discussion of Related Art

A typical computing system includes a processing unit and a memory unit. Most computing systems use random access memory architectures for the memory unit. Typically, fast memory circuits cost significantly more than slower memory circuits. Therefore, most memory units include a small but fast memory buffer called a cache and a slower main memory buffer. Various caching architectures for random access memory are well known in the art.

However, some computing systems use a stack architecture for the memory unit. A classical stack memory unit uses a last in first out access model. Conceptually, new data entering a stack memory unit is placed on top of the existing data, i.e., in the next available memory location. If data is requested from the stack, the last piece of data "on top of" the stack comes out first. For certain applications, stack-based memory architectures provide several advantages over random access memory architectures. For example, a stack memory architecture is well suited for a calculator using RPN notation.

Like random access memory based computing systems, many stack-based computing systems, including those implementing the JAVA virtual machine, use relatively slow memory devices to store the stack. In general, adding a cache for slow memory devices increases overall memory performance only if the vast majority of memory requests result in cache hits, i.e. the requested memory address is within the cache. Conventional cache designs are designed for random access memory architectures and do not perform well with stack-based memory architectures. Therefore, a caching method and a caching apparatus targeted to improve stack-based memory architectures are desirable.

SUMMARY OF THE INVENTION

Accordingly, the present invention provides a stack management unit including a stack cache to accelerate data retrieval from a stack and data storage into the stack. In one embodiment, the stack management unit includes a stack cache, a dribble manager unit, and a stack control unit. The dribble manager unit maintains a cached stack portion, typically a top portion of the stack in the stack cache. Specifically, when the stack-based computing system is pushing data onto the stack and the stack cache is almost full, the dribble manager unit transfers data from the bottom of the stack cache to the stack. When the stack-based computing system is popping data off the stack and the stack cache is becoming empty, the dribble manager unit transfers data from the stack to the bottom of the stack cache.

The stack cache includes a stack cache memory circuit, one or more read ports, and one or more write ports. The stack cache memory circuit contains a plurality of memory locations, each of which can contain one data word. In one embodiment the stack cache memory circuit is a register file configured with a circular buffer memory architecture. For the circular buffer architecture, the registers can be addressed using modulo addressing. Typically, an optop pointer is used to define and point to the first free memory location in the stack cache memory circuit and a bottom pointer is used to define and point to the bottom memory location in the stack cache memory circuit. As data words are pushed onto or popped off of the stack, the optop pointer is incremented or decremented, respectively. Similarly, as data words are spilled or filled between the stack cache memory circuit and the stack, the bottom pointer is incremented or decremented, respectively.

Some embodiments of the stack management unit include an overflow/underflow unit. The overflow/underflow unit detects and resolves overflow conditions, i.e., when the number of used data words required in the stack cache exceeds a overflow threshold or the capacity of the stack cache, and underflow conditions, i.e., when the number of used data words in the stack cache appears to be negative. If an overflow occurs the overflow/underflow unit suspends operation of the stack cache and causes the spill control unit to store the valid data words in the slow memory unit or data cache unit. Typically, overflows and underflows are caused by a large change in the value of the optop pointer or many frequent changes in the value of the optop pointer. Therefore, some embodiments of the overflow/underflow unit maintain the old value of the optop pointer in an old optop register to determine the amount of valid data in the stack cache after an overflow. After the valid data in the stack cache are spilled to the stack, the overflow/underflow unit equates the cache bottom pointer to the optop pointer. The overflow/underflow unit then resumes normal operation of the stack cache.

If an underflow condition occurs, the overflow/underflow unit suspends operation of the stack cache. In most underflow conditions, the data in stack the cache are no longer valid and are not saved. Therefore, the overflow/underflow unit equates the cache bottom pointer to the optop pointer and resumes operation of the stack cache. However, for underflows caused by context switches, the data in the stack cache must be saved. Therefore, on context switched underflows, the overflow/underflow unit suspends operation of the stack cache and causes the spill control unit to store the valid data words in the stack. After the valid data in the stack cache are saved, the overflow/underflow unit equates the cache bottom pointer to the optop pointer.

Furthermore, some embodiments of the stack management unit includes an address pipeline to transfer multiple data words by the spill control unit and the fill control unit to improve the throughput of spill and fill operations. The address pipeline contains an incrementor/decrementor circuit, a first address register and a second address register. An address multiplexer drives either the output signal of the incrementor/decrementor or the cache bottom pointer to the first address register. The output terminals of the first address register are coupled to the input terminals of the second address register. A stack cache multiplexer drives either the address in the first address register or the address in the second address register to the stack cache. A memory multiplexer drives either the address in the address multiplexer or in the first address register to the slow memory unit or a data cache unit of the slow memory unit. Furthermore, the address in the second address register can be used to adjust the value in the cache bottom pointer.

The stack management unit also includes a fill control unit and a spill control unit. If the fill control unit detects a fill condition, the fill control unit transfers data from the stack to the stack cache memory circuit. In one embodiment of the stack management unit, a stack cache status circuit, typically a subtractor, calculates the number of used data words in the stack cache memory circuit from the optop pointer and the cache bottom pointer. A fill condition occurs if the number of used memory locations in the stack cache memory circuit is less than a low cache threshold. Typically, the low cache threshold is stored in programmable registers. In embodiments of the stack cache management unit with an address pipeline, the fill control unit is typically configured to fill multiple data words for each fill condition.

If the spill control unit detects a spill condition, the spill control unit transfers data from the stack cache memory circuit to the stack. In one embodiment, a spill condition occurs if the number of used locations in the stack cache memory circuit is greater than the high cache threshold. Typically, the high cache threshold is stored in programmable registers. In embodiments of the stack management unit with an overflow/underflow unit, the overflow/underflow unit can cause the spill control unit to perform spill operations. Furthermore, in embodiments of the stack cache management unit with an address pipeline, the spill control unit is typically configured to spill multiple data words for each spill condition.

BRIEF DESCRIPTION THE DRAWINGS

FIG. 5 illustrates the contents of a register or memory location of one embodiment of a stack cache in accordance with this invention.

FIG. 6 illustrates a block diagram of one embodiment of a dribble manager unit in accordance with this invention.

Figure 1A:
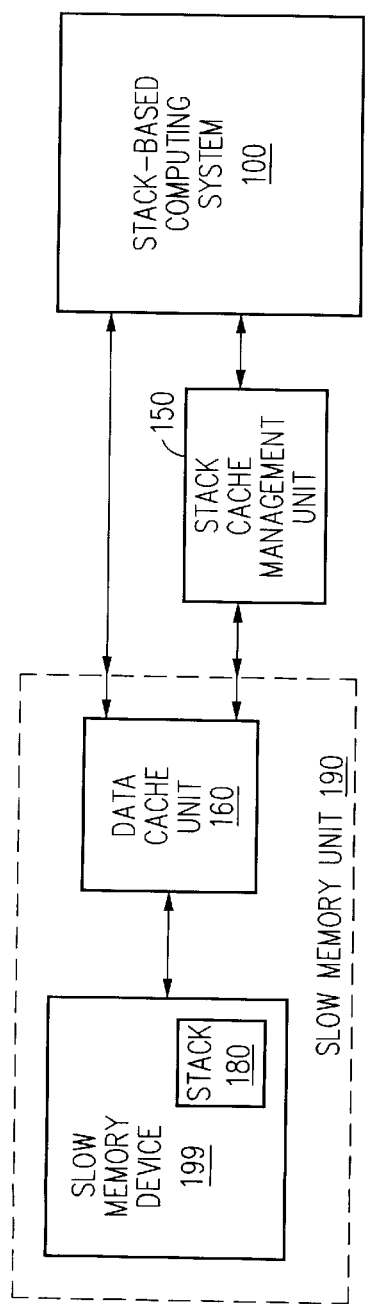
FIG. 1A is a block diagram of one embodiment of a stack-based computing system that utilizes the stack management unit of this invention.

These and other features and advantages of the present invention will be apparent from the Figures as explained in the Detailed Description of the Invention. Like or similar features are designated by the same reference numeral(s) throughout the drawings and the Detailed Description of the Invention.

DETAILED DESCRIPTION OF THE INVENTION

According to the principles of this invention, certain limitations imposed by conventional data caches have been overcome. The present invention provides a stack cache management unit which uses a stack cache to accelerate reading data from a stack as well as writing data to the stack. The stack cache management unit selectively transfers data between the stack cache and the stack to retain the portion of the stack that is most frequently accessed in the stack cache. The data transfers between the stack cache and the stack are pipelined to increase the throughput of the stack cache as well as to eliminate certain read-after-write and write-after-write cache coherency problems. In addition the stack cache management unit includes an overflow/underflow unit to resolve overflows and underflows of the stack cache due to rapid changes in the stack.

FIG. 1A illustrates one embodiment of a stack-based computing system 100 coupled to a stack cache management unit 150 in accordance with one embodiment of the present invention. Stack-based computing system 100 and stack cache management unit 150 are coupled to slow memory unit 190. Slow memory unit 190 includes an optional data cache unit 160 and a slow memory device 199. Slow memory unit 190 could be for example, the main memory of stack-based computing system 100 or a disk drive. If data cache unit 160 is not used, stack-based computing system 100 and stack cache management unit 150 are coupled directly to slow memory device 199. In some embodiments of the present invention, both stack cache management unit 150 and data cache unit 160 are incorporated into stack-based computing system 100.

Figure 1B:
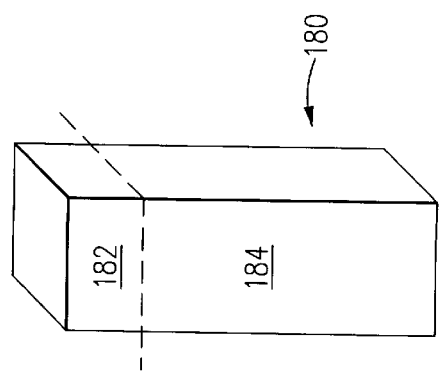
FIG. 1B is an illustration of one embodiment of the logical organization of a stack.

Stack-based computing system 100 manipulates data in a stack 180 (FIG. 1B) primarily stored in slow memory device 199 and data cache unit 160. A portion of stack 180 is also stored in a stack cache 255 (FIG. 2) of stack cache management unit 150. FIG. 1B illustrates the partitioning of stack 180. A cached stack portion 182 of stack 180 is stored in stack cache 255. Since most operations with stack 180 occur at the top of stack 180, stack cached portion 182 is usually a top portion of stack 180. However, during context switching, stack cached portion 182 may be from a middle portion of stack 180.

Figure 3:
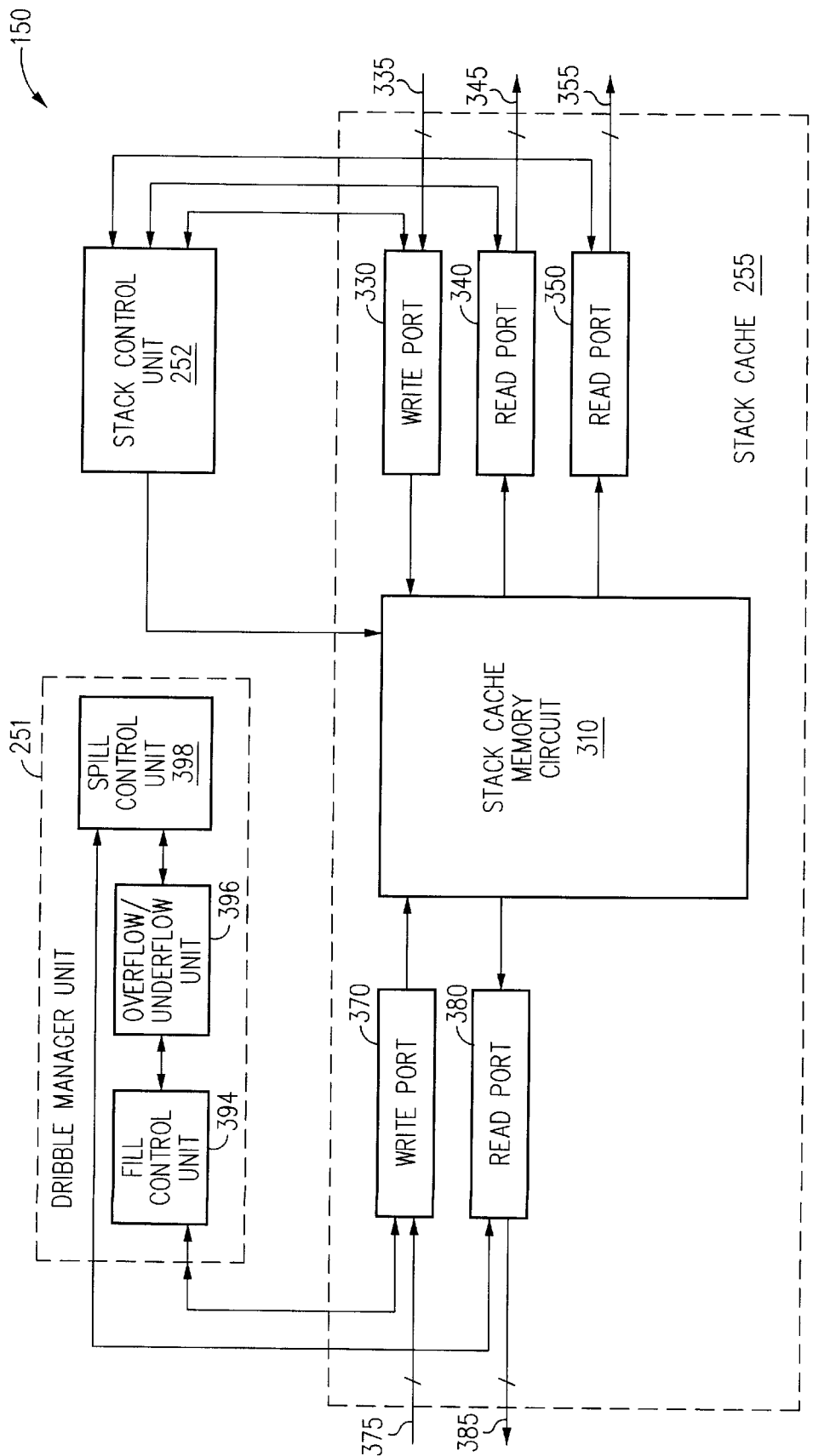
FIG. 3 illustrates a detailed block diagram of one embodiment of a stack cache management unit in accordance with this invention.

Typically, slow memory unit 190 has memory allocated for all of stack 180. However, in some embodiments of stack cache management unit 150, only a slow memory stack portion 184 is allocated in slow memory unit 190. For example, if slow memory unit 190 is a stack, better stack performance is obtained if stack cached portion 182 is stored in stack cache 255 and only slow memory stack portion 184 is stored in slow memory unit 190, because stack cache management unit 150 is only able to read and write data words from the top of slow memory unit 190. As used herein, the size of a data word is equal to the width of a memory location or register of stack cache memory circuit 310 (FIG. 3). In embodiments of slow memory unit 190 with data cache unit 160, some data words of stack 180 may be stored in data cache unit 160 and slow memory device 199.

Figure 2:
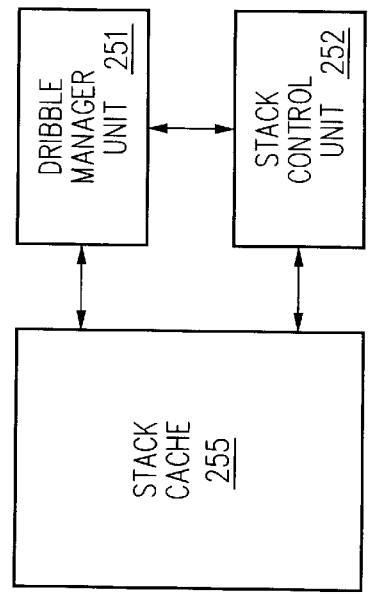
FIG. 2 illustrates a block diagram of one embodiment of a stack management unit in accordance with this invention.

FIG. 2 shows one embodiment of stack management unit 150 that utilizes a stack cache 255 to accelerate data retrieval from stack 180 and data storage into stack 180 by stack-based computing system 100. In the embodiment of FIG. 2, stack cache management unit 150 also includes a dribble manager unit 251 and a stack control unit 252. When stack-based computing system 100 is pushing data onto stack 180 (FIG. 1A), and stack cache 255 is almost full, dribble manager unit 251 transfers data from the bottom of stack cache 255 to stack 180 in slow memory unit 190, so that cached stack portion 182 of stack 180 retains the most recently written data words in stack cache 255. When stack-based computing system 100 is popping data off of stack 180 and stack cache 255 is almost empty, dribble manager unit 251 transfers data from stack 180 in slow memory unit 190 to the bottom of stack cache 255 so that a portion of stack 180 (i.e., cached stack portion 182) is maintained in stack cache 255.

Herein, for convenience, the value in a register and the register are assigned the same reference numeral. Further, in the following discussion, use of a register to store a pointer is illustrative only of one embodiment. Depending on the specific implementation of the invention, the pointer may be implemented using a hardware register, a hardware counter, a software counter, a software pointer, or other equivalent embodiments known to those of skill in the art. The particular implementation selected is not essential to the invention, and typically is made based on a price to performance trade-off.

In one embodiment, stack-based computing system 100 directly implements a stack 180 (FIG. 1B) that supports the JAVA virtual machine stack-based architecture. Up to sixty-four entries of stack 180 are contained on stack cache 255 in stack cache management unit 150. Some entries in stack 180 may be duplicated in stack cache 255. Operations on data are performed through stack cache 255. An embodiment of a JAVA virtual machine is described in U.S. patent application Ser. No. 08/787,736, which is now patented with U.S. Pat. No. 6,038,643, entitled "METHODS AND APPARATUSES FOR STACK CACHING" naming Mark Tremblay and James Michael O'Connor as inventors, assigned to the assignee of this application, and filed on Jan. 23, 1997, which is incorporated herein by reference in its entirety.

Stack 180 of stack-based computing system 100 is primarily used as a repository of information for methods. At any point in time, stack-based computing system 100 is executing a single method. Each method has memory space, i.e., a method frame on stack 180, allocated for a set of local variables, an operand stack, and an execution environment structure.

For double precision arguments, as well as double precision entities in general, the upper bits, i.e., the 32 most significant bits of a 64-bit double precision entity, are placed on the upper location of stack 180, i.e., pushed on the stack last. For example, when a 64-bit double precision entity is on the top of stack 180, the upper 32-bit portion of the 64-bit double precision entity is on the top of the stack, and the lower 32-bit portion of the 64-bit double precision entity is in the storage location immediately adjacent to the top of stack 180.

FIG. 3 is a block diagram of one embodiment of a stack cache management unit 150. Stack cache management unit 150 serves as a high speed buffer between slow memory unit 190 and stack-based computing system 100. For embodiments of slow memory unit 190 with data cache unit 160, stack cache management unit 150 typically transfers data to slow memory device 199 through data cache unit 160. Stack-based computing system 100 accesses stack cache management unit 150 as if stack cache management unit 150 were stack 180. Stack cache management unit 150 automatically transfers data between stack cache management unit 150 and stack 180 in slow memory unit 190 as necessary to improve the throughput of data between stack 180 and stack-based computing system 100. In the embodiment of FIG. 1A, if stack-based computing system 100 requires a data word which is not cached in stack cache management unit 150, data cache unit 160 retrieves the requested data word and provides the requested data word to stack-based computing system 100 directly.

Stack cache management unit 150 contains a stack cache memory circuit 310 in stack cache 255. Stack cache memory circuit 310 is typically a fast memory device such as a register file or SRAM; however, slower memory devices such as DRAM can also be used. In the embodiment of FIG. 3, access to stack cache memory circuit 310 is controlled by stack control unit 252. A write port 330 allows stack-based computing system 100 to write data on data lines 335 to stack cache memory circuit 310. Read port 340 and read port 350 allow stack-based computing system 100 to read data from stack cache memory circuit 310 on data lines 345 and 355, respectively. Two read ports are provided to increase throughput since many operations of stack-based computing systems require two operands from stack 180. Other embodiments of stack cache 255 may provide more or less read and write ports.

Dribble manager unit 251 controls the transfer of data between stack 180 (FIG. 1A) in slow memory unit 190 and stack cache memory circuit 310. In the embodiment shown in FIG. 1A, the transfer of data between stack 180 in slow memory unit 190 and stack cache memory circuit 310 goes through data cache unit 160. Dribble manager unit 251 includes a fill control unit 394 and a spill control unit 398. Some embodiments of dribble manager unit 251 also include an overflow/underflow unit 396. In some embodiments of dribble manager unit 251, fill control unit 394 and spill control unit 398 function independently.

Fill control unit 394 determines if a fill condition exists. If the fill condition exists, fill control unit 394 transfers data words from stack 180 to stack cache memory circuit 310 on data lines 375 through a write port 370. Spill control unit 398 determines if a spill condition exists. If the spill condition exists, spill control unit 398 transfers data words from stack cache memory circuit 310 to stack 180 through read port 380 on data lines 385.

Overflow/underflow unit 396 determines if an overflow condition or an underflow condition exists. If an overflow condition or an underflow condition exists, overflow/underflow unit 396 suspends operation of stack cache 255 to correct the overflow condition or underflow condition as described below. When overflow/underflow unit 396 suspends operation of stack cache 255, stack-based computing system 100 is unable to access stack cache 255. In some embodiments of stack cache management unit 150, overflow/underflow unit 396 prevents stack-based computing system 100 from accessing any portion of slow memory unit 190 during an overflow condition or an underflow condition, because overflow/underflow unit 396 requires control of slow memory unit 190 to resolve the overflow condition or underflow condition.

Write port 370 and read port 380 allow transfers between stack 180 and stack cache memory circuit 310 to occur simultaneously with reads and writes controlled by stack control unit 252. If contention for read and write ports of stack cache memory circuit 310 is not important, dribble manager unit 251 can share read and write ports with stack control unit 252.

Although stack cache management unit 150 is described in the context of buffering stack cache 180 for stack-based computing system 100, stack cache management unit 150 can perform caching for any stack-based computing system. The details of stack-based computing system 100, are provided only as an example of one possible stack-based computing system for use with the present invention. Thus, one skilled in the art can use the principles described herein to design a stack cache management unit in accordance to the present invention for any stack-based computing system.

Figure 4:
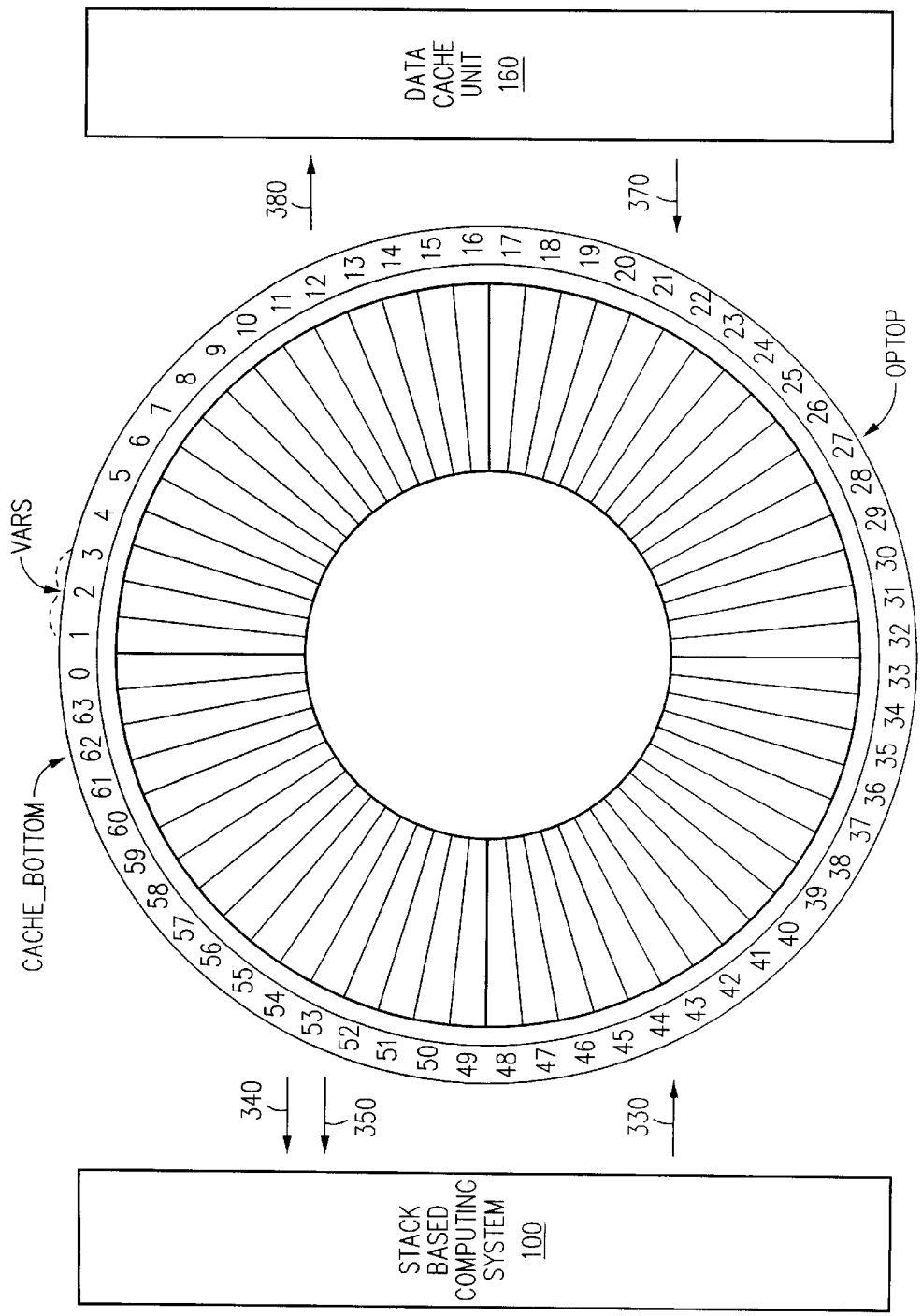
FIG. 4 illustrates the memory architecture of one embodiment of a stack cache in accordance with this invention.

FIG. 4 shows a conceptual model of the memory architecture of stack cache memory circuit 310 for one embodiment of stack cache 255. Specifically, in the embodiment of FIG. 4, stack cache memory circuit 310 is a register file organized in a circular buffer memory architecture capable of holding 64 data words. Other embodiments may contain a different number of data words.

The circular memory architecture causes data words in excess of the capacity of stack cache memory circuit 310 to be written to previously used registers. If stack cache memory unit 310 uses a different memory device, such as an SRAM, different registers would correspond to different memory locations. One technique to address registers in a circular buffer is to use pointers containing modulo stack cache size (modulo-SCS) addresses to the various registers of stack cache memory circuit 310. As used herein, modulo-N operations have the results of the standard operation mapped to a number between 0 and N−1 using a standard MOD N function. Some common modulo operations are defined as follows Modulo-N addition of X and Y=(X+Y) MOD N,
Modulo-N subtraction of X and Y=(X−Y) MOD N,
Modulo-N increment of X by Y=(X+Y) MOD N,
Modulo-N decrement of X by Y=(X−Y) MOD N.

One embodiment of the pointer addresses of the registers of stack cache memory circuit 310 are shown in FIG. 4 as numbered 0–63 along the outer edge of stack cache memory circuit 310. Thus for the embodiment of FIG. 4, if 70 data words (numbered 1 to 70) are written to stack cache memory circuit 310 when stack cache memory circuit 310 is empty, data words 1 to 64 are written to registers 0 to 63, respectively and data words 65 to 70 are written subsequently to registers 0 to 5. Prior to writing data words 65 to 70, dribble manager unit 251, as described below, transfers data words 1 to 6 which were in registers 0 to 5 to stack 180 in slow memory unit 190. Similarly, as data words 70 to 65 are read out of stack cache memory circuit 610, data words 1 to 6 can be retrieved from stack 180 in slow memory unit 190 and placed in memory locations 0 to 5.

Since most reads and writes on a stack are from the top of the stack, a pointer OPTOP typically contains the location just above the top of stack 180, i.e., the top memory location. In some embodiments of stack cache management unit 150, pointer OPTOP is a programmable register in stack-based computing system 100. However, other embodiments of stack cache management unit 150 maintain pointer OPTOP in stack control unit 252. Since pointer OPTOP is often increased by one, decreased by one, or changed by a specific amount, pointer OPTOP, in one embodiment is a programmable up/down counter.

Typically, pointer OPTOP indicates the first free register or data word in stack cache memory circuit 310, i.e., the register or data word following the register or data word containing the most recently written data word in stack cache memory circuit 310, i.e., pointer OPTOP points to the first free register of stack cache memory circuit 310. However, some embodiments of stack cache management unit 150 use pointer OPTOP to point to the data register containing the most recently written data word. Some embodiments of stack cache management unit 150 also contain a pointer OPTOP1 (not shown) which points to the register preceding the register pointed to by pointer OPTOP. Pointer OPTOP1 can improve the performance of stack management unit 150 since data is popped from the register pointed to by pointer OPTOP1. Furthermore, a pointer OPTOP2, which points to the register preceding the register pointed to by pointer OPTOP1, can improve the performance of stack cache management unit 150 since many operations in stack-based computing system 100 require two data words from stack cache management unit 150.

Pointer OPTOP, pointer OPTOP1, and pointer OPTOP2 are incremented whenever a new data word is written to stack cache 255. Pointer OPTOP, pointer OPTOP1, and pointer OPTOP2 are decremented whenever a stacked data word, i.e., a data word already in stack 180, is popped off stack cache 255. Since some embodiments of stack-based computing system 100 may add or remove multiple data words simultaneously, pointer OPTOP, pointer OPTOP1, and pointer OPTOP2 are implemented, in one embodiment, as programmable registers so that new values can be written into the registers rather than requiring multiple increment or decrement cycles.

If stack cache 255 is organized using sequential addressing, pointer OPTOP1 may also be implemented using a modulo SCS subtractor which modulo-SCS subtracts one from pointer OPTOP. If pointer OPTOP and pointer OPTOP1 are full length memory address pointers, i.e., the pointers address the memory space of stack-based operating system 100 beyond stack cache 255, normal subtraction can be used. For clarity, the various embodiments described herein all use a stack in which addresses are incremented as data is added to the stack. However, the principles of the present invention are easily adaptable to stacks in which addresses are decremented as data is added to the stack.

Since data words are stored in stack cache memory circuit 310 circularly, the bottom of stack cache memory circuit 310 can fluctuate. Therefore, most embodiments of stack cache management unit 150 include a pointer CACHE_BOTTOM to indicate the bottom memory location of stack cache memory circuit 310. Pointer CACHE_BOTTOM is typically maintained by dribble manager unit 251. The process to increment or decrement pointer CACHE_BOTTOM varies with the specific embodiment of stack cache management unit 150. Pointer CACHE_BOTTOM is typically implemented as a programmable up/down counter.

Some embodiments of stack cache management unit 150 also include other pointers, such as pointer VARS, which points to a memory location of a data word that is often accessed. For example, if stack-based computing system 100 is implementing the JAVA Virtual Machine, entire method frames may be placed in stack cache management unit 150. The method frames often contain local variables that are accessed frequently. Therefore, having pointer VARS pointed to the first local variable of the active method decreases the access time necessary to read the local variable. Other pointers such as a pointer VARS1 (not shown) and a pointer VARS2 (not shown) may point to other often used memory locations such as the next two local variables of the active method in a JAVA Virtual Machine. In some embodiments of stack cache management unit 150, these pointers are maintained in stack control unit 252. In other embodiments pointer VARS is stored in a programmable register in stack-based computing system 100. If stack cache 255 is organized using sequential addressing, pointer VARS1 may also be implemented using a modulo-SCS adder which modulo-SCS adds one to pointer VARS.

Typically, all registers or memory locations from pointer CACHE_BOTTOM up to but not including pointer OPTOP are treated as valid data words. Therefore, when stack cache management unit 150 is powered up or reset, pointer OPTOP and pointer CACHE_BOTTOM are set to the same value which signifies that no valid data words are in stack cache 255. In other embodiments, stack cache management unit 150 tags, i.e. tracks, the valid data words and the data words, which are in both stack cache memory circuit 310 and in slow memory unit 190. FIG. 5 illustrates one tagging scheme used in some embodiments of stack cache management unit 150.

Specifically, FIG. 5 shows a register 510 from stack cache memory circuit 310. The actual data word is stored in data section 512. A valid bit 514 and a saved bit 516 are used to track the status of the data word in register 510. If valid bit 514 is at a valid logic level, typically logic high, data section 512 contains a valid data word. If valid bit 514 is at an invalid logic level, typically logic low, data section 512 does not contain a valid data word. If saved bit 516 is at a saved logic level, typically logic high, the data word contained in data section 512 is also stored in slow memory unit 190. However, if saved bit 516 is at an unsaved logic level, typically logic low, the data word contained in data section 512 is not stored in slow memory unit 190. Typically, when stack cache management unit 150 is powered up or reset, valid bit 514 of each register is set to the invalid logic level and saved bit 516 of each register is set to the unsaved logic level. The embodiments of stack cache management unit 150, which do not use tagging, would not need to include valid bit 514 or saved bit 516.

For the embodiment illustrated in FIG. 3 using the tagging method of FIG. 5, when stack control unit 252 writes a data word to a register in stack cache memory circuit 310 through write port 330 the valid bit of that register is set to the valid logic level and the saved bit of that register is set to the unsaved logic level. When dribble manager unit 251 transfer a data word to a register of stack cache memory circuit 310 through write port 370, the valid bit of that register is set to the valid logic level and the saved bit of that register is set to the saved logic level since the data word is currently saved in slow memory unit 190.

When stack-based computing system 100 reads a stacked data word using a stack popping operation from a register of stack cache memory circuit 310 through either read port 340 or read port 350 the valid bit of that register is set to the invalid logic level and the saved bit of that location is set to the unsaved logic level. Typically, stack popping operations use the register indicated by pointer OPTOP1 or pointer OPTOP2.

When stack-based computing system 100 reads a data word with a non-stack popping operation from a register of stack cache memory circuit 310 through either read port 340 or read port 350 the valid bit and saved bit of the register are not changed. For example, if stack-based computing system 100 is implementing the JAVA Virtual Machine, a local variable stored in stack cache memory circuit 310 in the register indicated by pointer VARS may be used repeatedly and should not be removed from stack cache 255. When dribble manager unit 251 copies a data word from a register of stack cache memory circuit 310 to slow memory unit 190 through read port 380, the valid bit of that register remains in the valid logic level since the saved data word is still contained in that register and the saved bit of that register is set to the saved logic level.

Since stack cache 255 is generally much smaller than the memory address space of stack-based computing system 100, the pointers used to access stack cache memory circuit 310 are generally much smaller than general memory addresses. The specific technique used to map stack cache 255 into the memory space of stack-based computing system 100 can vary.

In one embodiment of stack-based computing system 100, the pointers used to access stack cache memory circuit 310 are only the lower bits of full-length memory address pointers, i.e., the least significant bits. For example, if stack cache memory circuit 310 comprises 64 registers, pointers OPTOP, VARS, and CACHE_BOTTOM need only be six bits long. If stack-based computing system 100 has a 12 bit address space, pointers OPTOP, VARS, and CACHE_BOTTOM could be the lower six bits of a full-length memory address pointer. Thus, stack cache memory circuit 310 is mapped to a specific segment of the address space having a unique upper six bit combination.

Figure 8A:
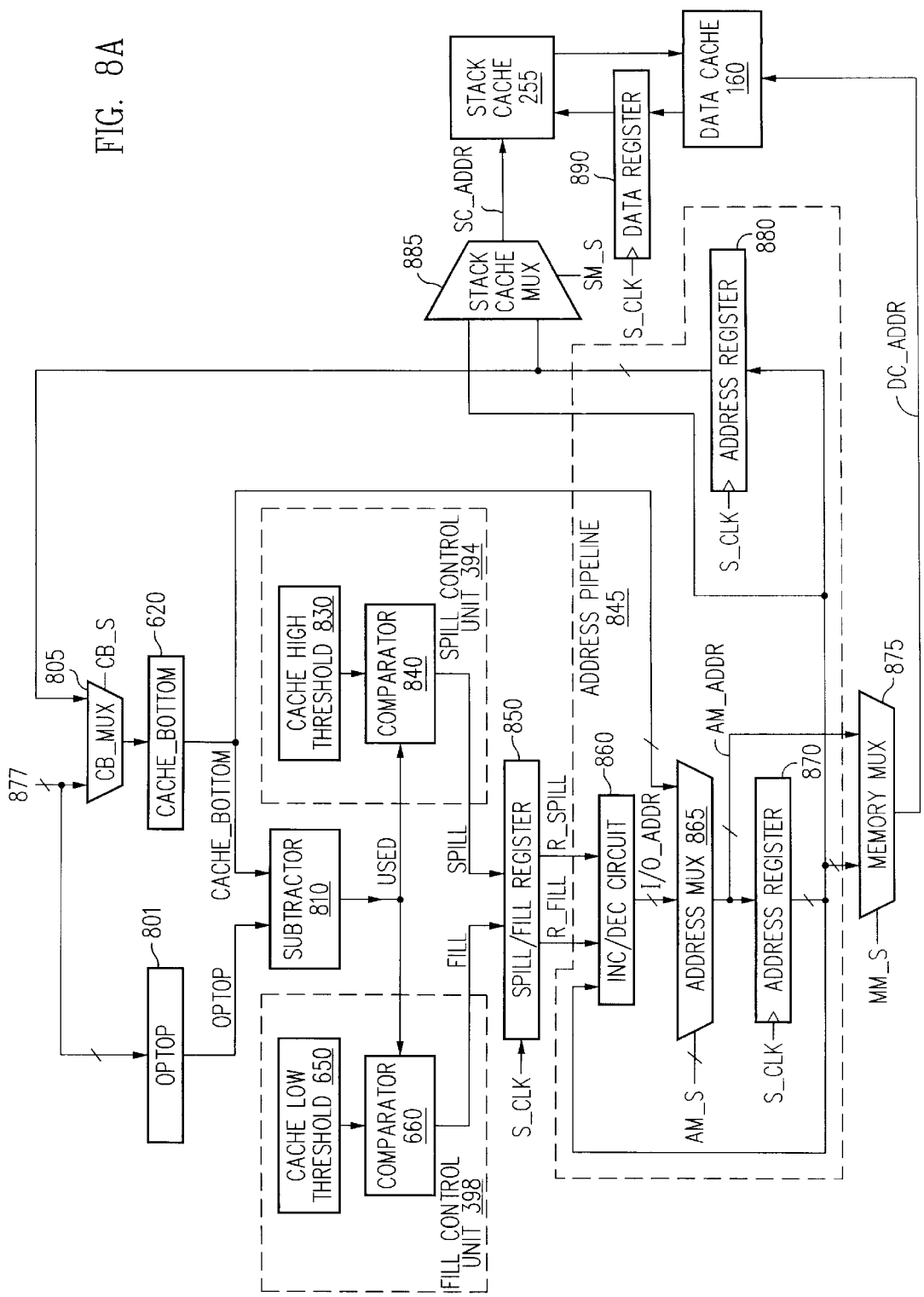
FIG. 8 illustrates a block diagram of a pipelined embodiment of a dribble manager unit in accordance with this invention.
FIG. 8B illustrates a simplified conceptual model of the pipelined embodiment of a dribble manager unit of FIG. 8A.
FIG. 8C illustrates a simplified conceptual model of the pipelined embodiment of a dribble manager unit of FIG. 8A.

In other embodiments, pointers OPTOP, VARS, and CACHE_BOTTOM are full length memory address pointers. The full length memory address pointers are used to calculate the status of stack cache 255; however, only the lower bits are used to address stack cache 255. Embodiments using full length pointers for pointer OPTOP and CACHE_BOTTOM do not require modulo computation since the lower bits used to address stack cache 255 are always in the proper range for stack cache 255. For completeness, the embodiment of dribble manager unit 251 of FIG. 8A is explained below using full length memory address pointer versions of pointer OPTOP and CACHE_BOTTOM.

Some embodiments of stack cache management unit 150 may be used with purely stacked based computing system so that there is not a memory address space for the system. In this situation, the pointers for accessing stack cache 255 are only internal to stack cache management unit 150.

As explained above, stack-based computing system 100 primarily accesses data near the top of the stack. Therefore, stack cache management unit 150 can improve data accesses of stack-based computing system 100 while only caching cached stack portion 182 of stack 180. When stack-based computing system 100 pushes more data words to stack cache management unit 150 than stack cache memory circuit 310 is able to store, the data words near the bottom of stack cache memory circuit 310 are transferred to stack 180 in slow memory unit 190. When stack-based computing system 100 pops data words out of stack cache 255, data words from stack 180 in slow memory unit 190 are copied under the bottom of stack cache memory circuit 310, and pointer CACHE_BOTTOM is decremented to point to the new bottom of stack cache memory circuit 310.

Determination of when to transfer data words between stack 180 and stack cache memory circuit 310 as well as how many data words to transfer can vary. In general, dribble manager unit 251 should transfer data from stack cache memory circuit 310 to stack 180 in slow memory unit 190, i.e., a spill operation, as stack-based computing system 100 fills stack cache memory circuit 310. Conversely, dribble manager unit 251 should copy data from stack 180 in slow memory unit 190 to stack cache memory circuit 310, i.e., a fill operation, as stack-based computing system 100 empties stack cache memory circuit 310.

FIG. 6 shows one embodiment of dribble manager unit 251 in which decisions on transferring data from stack cache memory circuit 310 to stack 180 in slow memory unit 190, i.e., spilling data, are based on the number of free registers in stack cache memory circuit 310. Free registers includes registers without valid data as well as registers containing data already stored in stack 180 in slow memory unit 190, i.e., registers with saved bit 516 set to the saved logic level for embodiments of stack cache management unit 150 using saved bit 516.

Decisions on transferring data from stack 180 in slow memory unit 190 to stack cache memory circuit 310, i.e., filling data, are based on the number of used registers. A used register contains a valid but unsaved data word in stack cache memory circuit 310. Typically, for embodiments without valid and saved bits, the used registers start from the location indicated by pointer CACHE_BOTTOM and end at the location preceding the location indicated by pointer OPTOP, because typically pointer OPTOP points to the first free register. However, other embodiments may have pointer OPTOP point to the last used register.

Specifically in the embodiment of FIG. 6, dribble manager unit 251 further includes a stack cache status circuit 610 and a cache bottom register 620, which can be a programmable up/down counter. Stack cache status circuit 610 receives pointer CACHE_BOTTOM from cache bottom register 620 and pointer OPTOP to determine the number of free registers FREE and the number of used registers USED.

For a circular buffer using sequential modulo-SCS addressing, as in FIG. 4, the number of free registers FREE is defined as

FREE=SCS−(OPTOP−CACHE_BOTTOM)MOD SCS, where SCS is the size of stack cache 255. Thus, for the specific pointer values shown in FIG. 4, the number of free registers FREE is 34, as calculated by:

FREE=64−((27−62)MOD 64)=35.

Similarly, for a circular buffer using sequential modulo addressing, the number of used registers USED is defined as:

USED=(OPTOP−CACHE_BOTTOM)MOD SCS.

Thus, for the specific pointer values shown in FIG. 4, the number of used registers USED is 30, as calculated by:

USED=(27−62)MOD 64=29.

Thus, stack cache status circuit 610 can be implemented with a modulo SCS adder/subtractor. The number of used registers USED and the number of free registers FREE can also be generated using a programmable up/down counter. For example, a used register can be incremented whenever a data word is added to stack cache 255 and decremented whenever a data word is removed from stack cache 255. Specifically, if pointer OPTOP is modulo-SCS incremented by some amount, the used register is incremented by the same amount. If pointer OPTOP is modulo-SCS decremented by some amount, the used register is decremented by the same amount. However, if pointer CACHE_BOTTOM is modulo-SCS incremented by some amount, the used register is decremented by the same amount. If pointer CACHE_BOTTOM is modulo-SCS decremented by some amount, the used register is incremented the same amount. The number of free registers FREE can be generated by subtracting the number of used registers USED from the total number of registers.

Spill control unit 394 (FIGS. 3 and 6) includes a cache high threshold register 630 and a comparator 640. Comparator 640 compares the value in cache high threshold register 630 to the number of free registers FREE. If the number of free registers FREE is less than the value in cache high threshold register 630, comparator 640 drives a spill signal SPILL to a spill logic level, typically logic high, to indicate that the spill condition exists and one or more data words should be transferred from stack cache memory circuit 310 to stack 180 in slow memory unit 190, i.e., a spill operation should be performed. The spill operation is described in more detail below. Typically, cache high threshold register 630 is programmable by stack-based computing system 100.

Fill control unit 398 (FIGS. 3, 6, and 8A) includes a cache low threshold register 650 and a comparator 660. Comparator 660 compares the value in cache low threshold register 650 to the number of used registers USED. If the number of used registers is less than the value in cache low threshold register 650, comparator 660 drives a fill signal FILL to a fill logic level, typically logic high, to indicate that the fill condition exists and one or more data words should be transferred from stack 180 to stack cache memory circuit 310, i.e., a fill operation should be performed. The fill operation is described in more detail below. Typically, cache low threshold register 650 is programmable by stack-based computing system 100.

If the value in cache high threshold 630 and cache low threshold 640 is always the same, a single cache threshold register can be used. Fill control unit 398 can be modified to use the number of free registers FREE to drive signal FILL to the fill logic level if then number of free registers is greater than the value in cache low threshold 650, with a proper modification of the value in cache low threshold 650. Alternatively, spill control unit 394 can be modified to use the number of used registers as explained in detail below with respect to FIG. 8A.

Figure 7A:
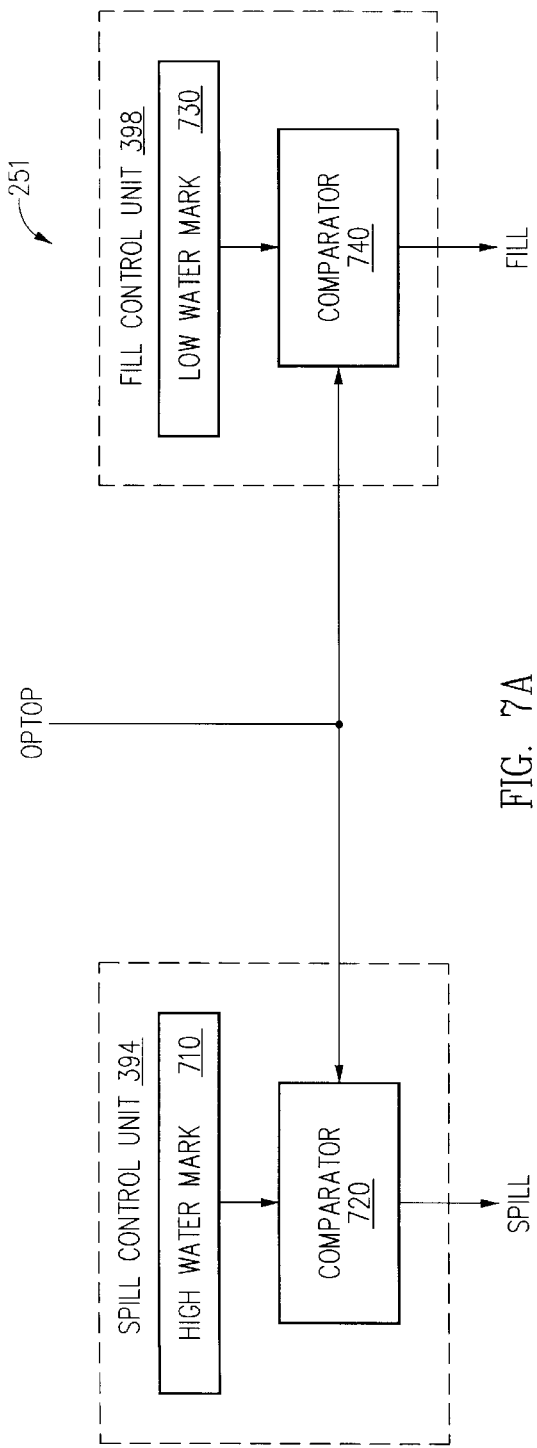
FIG. 7A illustrates a block diagram of another embodiment of a dribble manager unit in accordance with this invention.

FIG. 7A shows another embodiment of dribble manager unit 251, which uses a high-water mark/low-water mark heuristic to determine when a spill condition or a fill condition exists. Spill control unit 394 includes a high water mark register 710 implemented as a programmable up/down counter. A comparator 720 in spill control unit 394 compares the value in high water mark register 710, i.e., the high water mark, with pointer OPTOP. If pointer OPTOP is greater than the high water mark, comparator 720 drives spill signal SPILL to the spill logic level to indicate a spill operation should be performed. Since, the high water mark is relative to pointer CACHE_BOTTOM, the high water mark is modulo-SCS incremented and modulo-SCS decremented whenever pointer CACHE_BOTTOM is modulo-SCS incremented or modulo-SCS decremented, respectively.

Fill control unit 398 includes a low water mark register 710 implemented as a programmable up/down counter. A comparator 730 in fill control unit 398 compares the value in low water mark register 730, i.e., the low water mark, with pointer OPTOP. If pointer OPTOP is less than the low water mark, comparator 740 drives fill signal FILL to the fill logic level to indicate a fill operation should be performed. Since the low water mark is relative to pointer CACHE_BOTTOM, the low water mark register is modulo-SCS incremented and modulo-SCS decremented whenever pointer CACHE_BOTTOM is modulo-SCS incremented or modulo-SCS decremented, respectively.

Figure 7B:
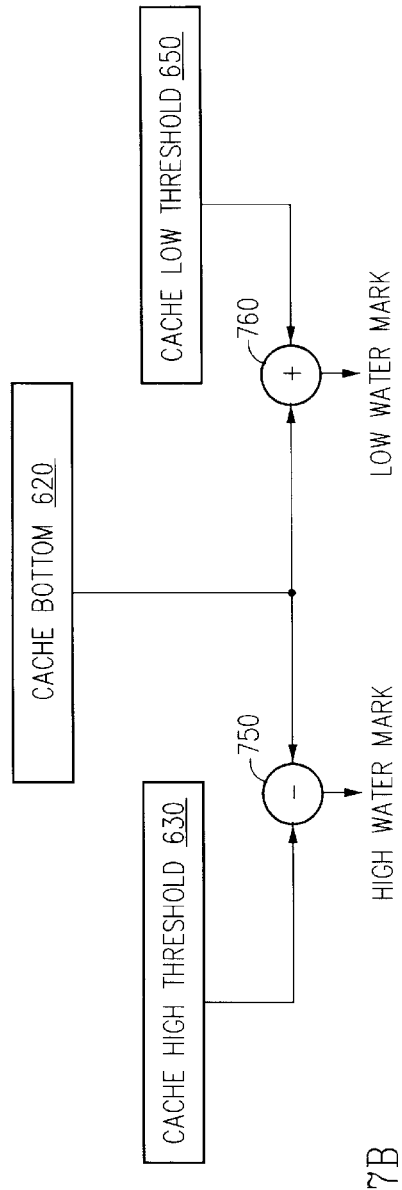
FIG. 7B illustrates a block diagram of another embodiment of a dribble manager unit in accordance with this invention.

FIG. 7B shows an alternative circuit to generate the high water mark and low water mark. Cache high threshold register 630, typically implemented as a programmable register, contains the number of free registers which should be maintained in stack cache memory circuit 310. The high water mark is then calculated by modulo-SCS subtractor 750 by modulo-SCS subtracting the value in cache high threshold register 630 from pointer CACHE_BOTTOM stored in cache bottom register 620.

The low water mark is calculated by doing a modulo-SCS addition. Specifically, cache low threshold register 650 is programmed to contain the minimum number of used data registers desired to be maintained in stack cache memory circuit 310. The low water mark is then calculated by modulo-SCS adder 760 by modulo-SCS adding the value in cache low threshold register 650 with pointer CACHE_BOTTOM stored in cache bottom register 620.

As described above, a spill operation is the transfer of one or more data words from stack cache memory circuit 310 to stack 180 in slow memory unit 190. In the embodiment of FIG. 1A, the transfers occur though data cache unit 160. The specific interface between stack cache management unit 150 and data cache unit 160 can vary. Typically, stack cache management unit 150, and more specifically dribble manager unit 251, sends the data word located at the bottom of stack cache 255, as indicated by pointer CACHE_BOTTOM from read port 380 to data cache unit 160. The value of pointer CACHE_BOTTOM is also provided to data cache unit 160 so that data cache unit 160 can address the data word appropriately.

For embodiments of stack cache management unit 150 using saved bits, the saved bit of the register indicated by pointer CACHE_BOTTOM is set to the saved logic level. In addition, pointer CACHE_BOTTOM is modulo-SCS incremented by one. Other registers as described above may also be modulo-SCS incremented by one. For example, high water mark register 710 (FIG. 7A)and low water mark 730 would be modulo-SCS incremented by one.

Some embodiments of dribble manager unit 251 transfer multiple words for each spill operation, such as the pipelined embodiment of FIG. 8A described below. For these embodiments, pointer CACHE_BOTTOM is modulo-SCS incremented by the number words transferred to stack 180 in slow memory unit 190.

In embodiments using a saved bit and valid bit, as shown in FIG. 5, some optimization is possible. Specifically, if the saved bit of the data register pointed to by pointer CACHE_BOTTOM is at the saved logic level, the data word in that data register is already stored in stack 180 in slow memory unit 190. Therefore, the data word in that data register does not need to be copied to stack 180 in slow memory unit 190. However, pointer CACHE_BOTTOM is still modulo-SCS incremented by one.

A fill operation transfers data words from stack 180 to stack cache memory circuit 310. In the embodiment of FIG. 1A, the transfers occur though data cache unit 160. The specific interface between stack cache management unit 150 and data cache unit 160 can vary.

Typically, stack cache management unit 150, and more specifically dribble manager unit 251, determines whether the data register preceding the data register pointed by CACHE_BOTTOM is free, i.e., either the saved bit is in the saved logic level or the valid bit is in the invalid logic level. If the data register preceding the data register pointed to by pointer CACHE_BOTTOM is free, dribble manager unit 251 requests a data word from stack 180 in slow memory unit 190 by sending a request with the value of pointer CACHE_BOTTOM modulo-SCS minus one. When the data word is received from data cache unit 160, pointer CACHE_BOTTOM is modulo-SCS decremented by one and the received data word is written to the data register pointed to by pointer CACHE_BOTTOM through write port 370. Other registers as described above may also be modulo-SCS decremented. The saved bit and valid bit of the register pointed to by pointer CACHE_BOTTOM are set to the saved logic level and valid logic level, respectively. Some embodiments of dribble manager unit 251 transfer multiple words for each spill operation. For these embodiments, pointer CACHE_BOTTOM is modulo-SCS decremented by the number words transferred to stack 180 in slow memory unit 190.

In embodiments using a saved bit and valid bit, as shown in FIG. 5, some optimization is possible. Specifically, if the saved bit and valid bit of the data register preceding the data register pointed to by pointer CACHE_BOTTOM is at the saved logic level and the valid logic level, respectively, then the data word in that data register was never overwritten. Therefore, the data word in that data register does not need to be copied from stack 180 in slow memory unit 190. However, pointer CACHE_BOTTOM is still modulo-SCS decremented by one.

IF stack-based computing system 100 operates at a very high frequency, dribble manager unit 251 may not be able to perform the spill and fill functions in one system clock cycle. However, since stack-based computing system 100 reads and writes data from stack cache management unit 150 in one cycle, the latency of a multi-cycle dribble manager unit might be unable to keep pace with stack-based computing system. Furthermore, the latency of a multi-cycle dribble manager unit can cause some cache coherency problems. For example, if a fill condition occurs, pointer CACHE_BOTTOM is decremented and the data word corresponding to the new value of pointer CACHE_BOTTOM is retrieved from data cache unit 160. If stack-based computing system 100 attempts to read the data word at the new CACHE_BOTTOM location after pointer CACHE_BOTTOM is decremented but before the data word is retrieved from data cache unit 160, stack-based computing system 100 reads incorrect data from stack cache memory circuit 310.

In one embodiment of dribble manager unit 251, both the stack coherency problem and the speed problem of the multi-cycle fill operation are solved by decrementing pointer CACHE_BOTTOM only after the data word is retrieved from data cache unit 160. If as in the example above, stack-based computing system 100 reads from what would be the new cache bottom, a stack cache miss occurs so that stack-based computing system 100 must retrieve the data word directly from data cache unit 160. The speed problem is solved by pipelining multiple fill operations whenever a fill operation is required. Specifically, since pointer CACHE_BOTTOM is not updated until the data word is retrieved from data cache unit 160, fill control unit 398 detects a fill condition every clock cycle until pointer CACHE_BOTTOM is updated to a value which removes the fill condition. Similarly, spill operations are also pipelined to increase the throughput of stack cache 255.

FIG. 8A, shows a pipelined embodiment of dribble manager unit 251. In addition, the Verilog code for another pipelined embodiment of dribble manager unit 251 is provided in Microfiche Appendix A. Specifically, the pipelined embodiment of dribble manager unit 251 of FIG. 8A uses an address pipeline 845, which includes an INC/DEC circuit 860, an address multiplexer 865, an address register 870, an address register 880, and cache bottom register 620, to transfer multiple data words during each fill condition or spill condition.

In the embodiment of FIG. 8A, pointer OPTOP and pointer CACHE_BOTTOM are full-length memory address pointers to slow memory unit 190. Only a few of the lower bits are used to address stack cache memory circuit 310, i.e., 6 bits for embodiments of stack cache memory circuit 310 having 64 data registers or data words. Subtractor 810 subtracts pointer CACHE_BOTTOM in cache bottom register 620 from pointer OPTOP in OPTOP register 801 to determine the number of used registers USED in stack cache memory circuit 310. Specifically the number of used registers USED is given by:

USED=(OPTOP−CACHE_BOTTOM);

since in the embodiment of FIG. 8A, pointer OPTOP points to the first unused register.

In the embodiment of spill control unit 394 in FIG. 8A, a comparator 840 compares the value in cache high threshold register 630 to the number of used registers USED. If the number of used registers USED is greater than the value in cache high threshold register 840, comparator 840 drives spill signal SPILL to spill logic level, typically logic high, to indicate that the spill condition exists and one or more data words should be transferred from cached stack portion 182 in stack cache memory circuit 310 to stack 180 in data cache unit 160 and slow memory device 199, i.e., a spill operation should be performed. Typically, cache high threshold register 830 is programmable by stack-based computing system 100. Furthermore, some embodiments of comparator 840 drives spill signal SPILL to a spill logic level when the number of used registers USED is greater than or equal to the value in cache high threshold register 830. Alternatively, the embodiments of spill control unit 394 in FIG. 6 or FIG. 7A can be used to generate spill signal SPILL.

In the embodiment of fill control unit 398 in FIG. 8A, a comparator 660 compares the value in cache low threshold register 650 to the number of used registers USED. If the number of used registers is less than the value in cache low threshold register 650, comparator 660 drives fill signal FILL to fill logic level, typically logic high, to indicate that the fill condition exists and one or more data words should be transferred from stack 180 in data cache unit 160 or slow memory device 190 to cached stack portion 182 of stack 180 in stack cache memory circuit 310, i.e., a fill operation should be performed. Typically, cache low threshold register 650 is programmable by stack-based computing system 100. Alternatively, the embodiments of fill control unit 398 in FIG. 6 or FIG. 7A can be used to generate fill signal FILL.

A spill/fill register 850, which is clocked by a system clock signal S_CLK, captures fill signal FILL and spill signal SPILL to generate a registered spill signal R_SPILL and a registered fill signal R_FILL. In some embodiments of stack cache 255, spilling and filling are suppressed or activated under certain conditions as described below. Thus, some embodiments of spill/fill register 850 monitor other signals as well as spill signal SPILL and fill signal FILL to determine the logic level of registered spill signal R_SPILL and a registered fill signal R_FILL.

Spill/fill register 850 drives registered spill signal R_SPILL and registered fill signal R_FILL to INC/DEC circuit 860, which also receives the address in address register 870 as an input signal. INC/DEC circuit 860 functions as an incrementor on spills and a decrementor on fills. Specifically, INC/DEC circuit 860 increments the input value from address register 870 by one if registered spill signal R_SPILL is at a spill logic level to indicate a spill condition exists. However, if registered fill signal R_FILL is at a fill logic level to indicate a fill condition exists, INC/DEC circuit 860 decrements the input value from address register 870.

Address I/D_ADDR, which is generated by INC/DEC circuit 860, is coupled to a first input port of address multiplexer (MUX) 865. Address multiplexer 865 also receives pointer CACHE_BOTTOM from cache bottom register 620 on a second input port. The output port of address multiplexer 865 is coupled to address register 870 and a second input port of memory multiplexer 875. Select line AM_S of address multiplexer 865 is coupled so that if a spill or a fill is in progress, i.e., if either registered spill signal R_SPILL is in the spill logic level or registered fill signal R_FILL is in the fill logic level, address multiplexer 865 outputs the address from INC/DEC circuit 860. Otherwise, address mux 865 outputs the address from cache bottom register 620. Thus, in one embodiment of dribble management unit 251, select line AM_S is coupled to the logical OR of registered spill signal R_SPILL with registered fill signal R_FILL. Address register 870 is clocked by system clock S_CLK, i.e., address register 870 performs a parallel load on active edges of system clock S_CLK. Prior to the detection of a spill condition or fill condition, address register 870 contains the same value as pointer CACHE_BOTTOM. Some embodiments of address register 870 include a clock enable input (not shown) so the value of address register 870 can be maintained for multiple system clock periods.

A memory multiplexer 875 drives either the address in address register 870, which is received on a first input port of memory multiplexer 875, or an address from address multiplexer 865, which is received on a second input port of memory multiplexer 875, to data cache unit 160 depending on the state of the signal on select line MM_S. In embodiments without data cache unit 160, memory multiplexer 875 drives an address directly to slow memory unit 190.

In one embodiment of dribble manager unit 251, memory multiplexer 875 drives the address from address register 870 if a spill is in progress and drives the address from address mux 865 if no spill is in progress. Thus in this embodiment, select line MM_S is coupled to registered spill signal R_SPILL.

The output terminals of address register 870 are also coupled to the input terminals of address register 880, which is also clocked by system clock S_CLK. Address register 880 provides a one clock cycle delay in addressing stack cache 255 on data transfers from data cache 160 to stack cache 255 to compensate for the delay the delay caused by data register 890. Detailed timing diagrams for FIG. 8A are provided in FIGS. 9A and 9B, which are described below. A stack cache multiplexer 885, drives either the address in address register 870, which is received on a first input port of multiplexer 885, or an address from address register 880, which is received on a second input port of multiplexer 885, as address SC_ADDR for stack cache 255, depending on the logic level of the signal on select line SM_S. Typically, during fill operations stack multiplexer 885 outputs the address from address register 880. Thus, in some embodiments select line MM_S is coupled to registered fill signal R_FILL. Due to the pipelining of dribble manager unit 251, some embodiments couple select line MM_S to registered fill signal R_FILL through a two clock cycle delay. The output terminals of register 880 are also coupled to an input port of cache bottom multiplexer 805 to update cache bottom register 620. Select line CB_S is usually configured so that cache bottom multiplexer 805 outputs the address from address register 880. However, during overflow conditions (as described below) and underflow conditions (as described below) cache bottom register 620 is programmed to equal pointer OPTOP directly from stack-based computing system 100 via address lines 877.

A optional data register 890, which is clocked by system clock S_CLK, is coupled between data cache unit 160 and stack cache 255 for data transfers from data cache unit 160 to stack cache 255. Data register 890 is required if the access time for reading data from data cache unit 160 is too large to accommodate the write access time of stack cache 255. Typically, data from stack cache 255 goes directly to data cache unit 160. However if the access time for reading from stack cache 255 is too large another data register (not shown) can be used between stack cache 255 and data cache unit 160.

Figure 8B:
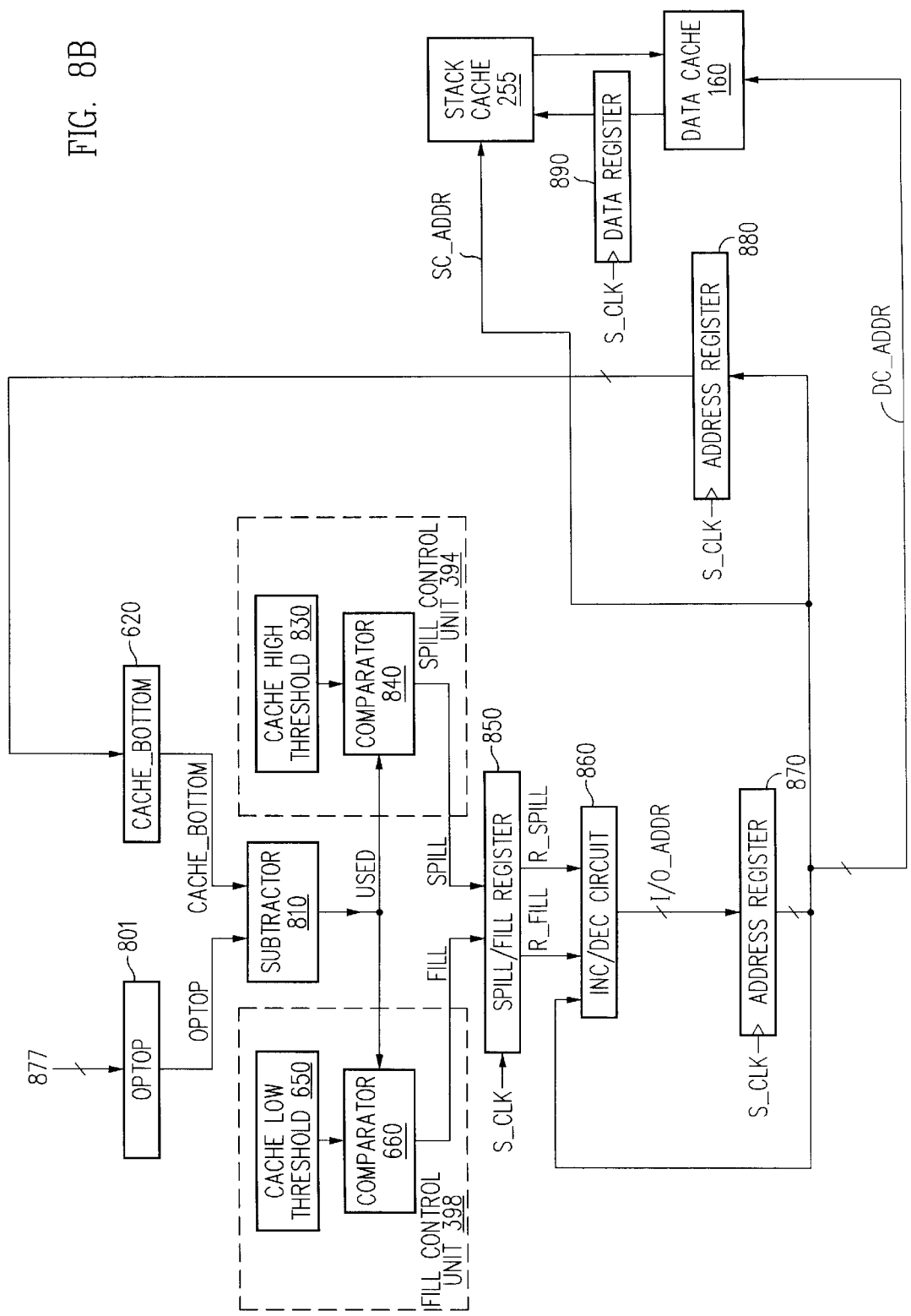

FIG. 8B shows the electrical connections of the address path during a spill condition. The multiplexers of FIG. 8A have been replaced with physical connections for illustrative purposes only. Similarly, FIG. 8C shows the electrical connections of the address path during a fill condition. FIGS. 8B and 8C are used to clarify the timing diagrams of FIGS. 9A and 9B. The multiplexers would add some propagation delay in the circuit of FIG. 8B which are too small to detail in the timing diagrams of FIGS. 9A and 9B. One skilled in the art would appreciate that multiplexers using transmission gates with very low propagation delays can be used for the multiplexers of FIG. 8A.

Figure 9A:
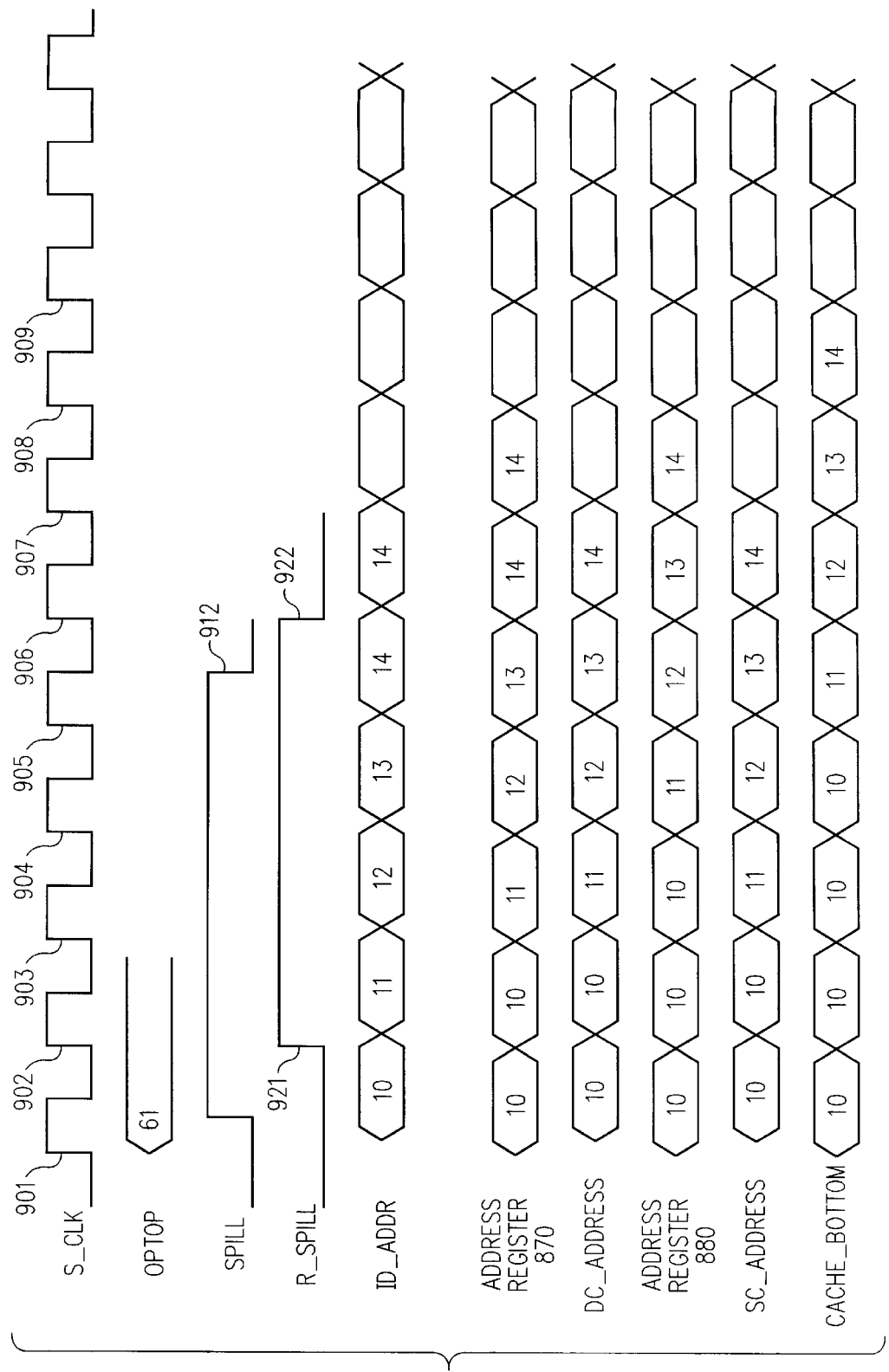
FIG. 9A is a timing diagram for the pipelined embodiment of a dribble manager unit of FIG. 8A.

FIG. 9A shows a timing diagram for the circuit of FIGS. 8A and 8B for a spill operation. As used herein clock period N–P refers to the time interval between active, rising in FIG. 9A, edge N of system clock signal S_CLK and active edge N+1. Thus clock period 901-P refers to the time interval between active (rising) edge 901 and active (rising edge 902 of system clock signal S_CLK.

The values in the timing diagram of FIG. 9A represent the lower 6 bits of pointer CACHE_BOTTOM, pointer OPTOP, and the various memory addresses. In FIG. 9A, pointer CACHE_BOTTOM starts with a value of 10, pointer OPTOP reaches a value of 61 at active (rising) edge 901 of system clock signal S_CLK, and cache high threshold register contains a value of 50. After pointer OPTOP reaches 61, the number of used registers USED from subtractor 810 is 51. Therefore, comparator 840 drives spill signal SPILL to the spill logic level (logic high in FIG. 9A).

At active edge 902, spill/fill register 850 drives registered spill signal R_SPILL to the spill logic level (logic high). While registered spill signal R_SPILL is at the spill logic level (logic high), INC/DEC circuit 860 increments the address from address register 870. Furthermore, stack cache 255 is given a read signal during every clock cycle registered spill signal R_SPILL is at the spill logic level. Similarly, data cache unit 160 is given a write signal during every clock cycle registered spill signal R_SPILL is at the spill logic level.

As explained above, during a spill condition, address multiplexer 865 outputs address I/D_ADDR from INC/DEC circuit 860; memory mux 875 outputs the value from address register 870; stack cache multiplexer 885 outputs the value from address register 870, and cache bottom multiplexer 805 outputs the address from address register 880. Thus, the simplified circuit of FIG. 8B may help to clarify the timing diagram of FIG. 9A.

After rising edge 921 of registered spill signal R_SPILL, INC/DEC circuit 860 adds one to the output address in address register 870. Thus during clock period 902-P address ID_is 11. Since address register 870 is synchronized with system clock signal S_CLK, the contents of address register 870 transition to 11 after active (rising) edge 903. Since the output address in address register 870 serves as an input signal of INC/DEC circuit 860, INC/DEC circuit 860 and address register 870 are incremented every clock cycle that registered spill signal R_SPILL is at the spill logic level. After a small propagation delay the contents of address register 870 are sent to stack cache 255 (SC_ADDR) and data cache unit 160 (DC_ADDR).

Address register 880, which is also synchronized to system clock signal S_CLK, transitions to 11 after active (rising) edge 904 of system clock signal S_CLK. The contents of cache bottom register 620, which is also synchronized to system clock signal S_CLK, transitions to 11 after rising edge 905. After the transition, of cache bottom register 620, the number of used registers USED becomes 60, thus spill signal SPILL transitions out of the spill logic level. Registered spill signal R_SPILL transitions out of the spill logic level after active (rising) edge 906 of clock signal S_CLK at falling edge 922.

In the example of FIG. 9A, registered spill signal R_SPILL is at the spill logic level for four clock cycles. Therefore, four data words from stack cache 255 are transferred to data cache unit 160. In general, if the number of used data registers USED is greater than the contents of cache high threshold by N, N+3 data words are transferred from stack cache 255 to data cache unit 160 for the embodiment of FIG. 8A. Furthermore, while dribble manager unit 251 is spilling words to data cache unit 160, stack-based computing system 100 may be adding words to the stack, thus pointer OPTOP can be increased during a spill operation which may increase the number of words spilled. For example if the lower six bits of pointer OPTOP is updated to 62 during clock period 904-P, registered spill signal R_SPILL would remain at the spill logic level until active (rising) edge 907 of system clock signal S_CLK.

A write-after-write (WAW) cache coherency problem may occur if stack-based computing system 100 tries to write data to stack cache 255 near pointer CACHE_BOTTOM during a spill condition. For example, if a spill is occurring as in FIG. 9A and if stack-based computing system updates location 10 of stack cache 255 during clock period 903-P, dribble manager unit 251 might have already copied the old contents of location 10 to data register 890 and not realize that location 10 has been updated. By clock cycle 905, pointer CACHE_BOTTOM is updated to show that location 10 is no longer valid. Consequently, the updated value in location 10 is not saved into slow memory unit 190. Therefore, one embodiment of dribble manager unit 251 cancels all spill operations if stack-based computing system 100 writes to a location within two of pointer CACHE_BOTTOM. After stack-based computing system 100 completes the data write to stack cache 255, dribble management unit 251 begins the spill operation as described above. In one embodiment, canceling of the spill operation is accomplished by having INC/DEC circuit 860 suppress registered spill signal R_SPILL during a write to a memory location near the memory location that is accessed by pointer CACHE_BOTTOM by stack-based computing system 100.

Figure 9B:
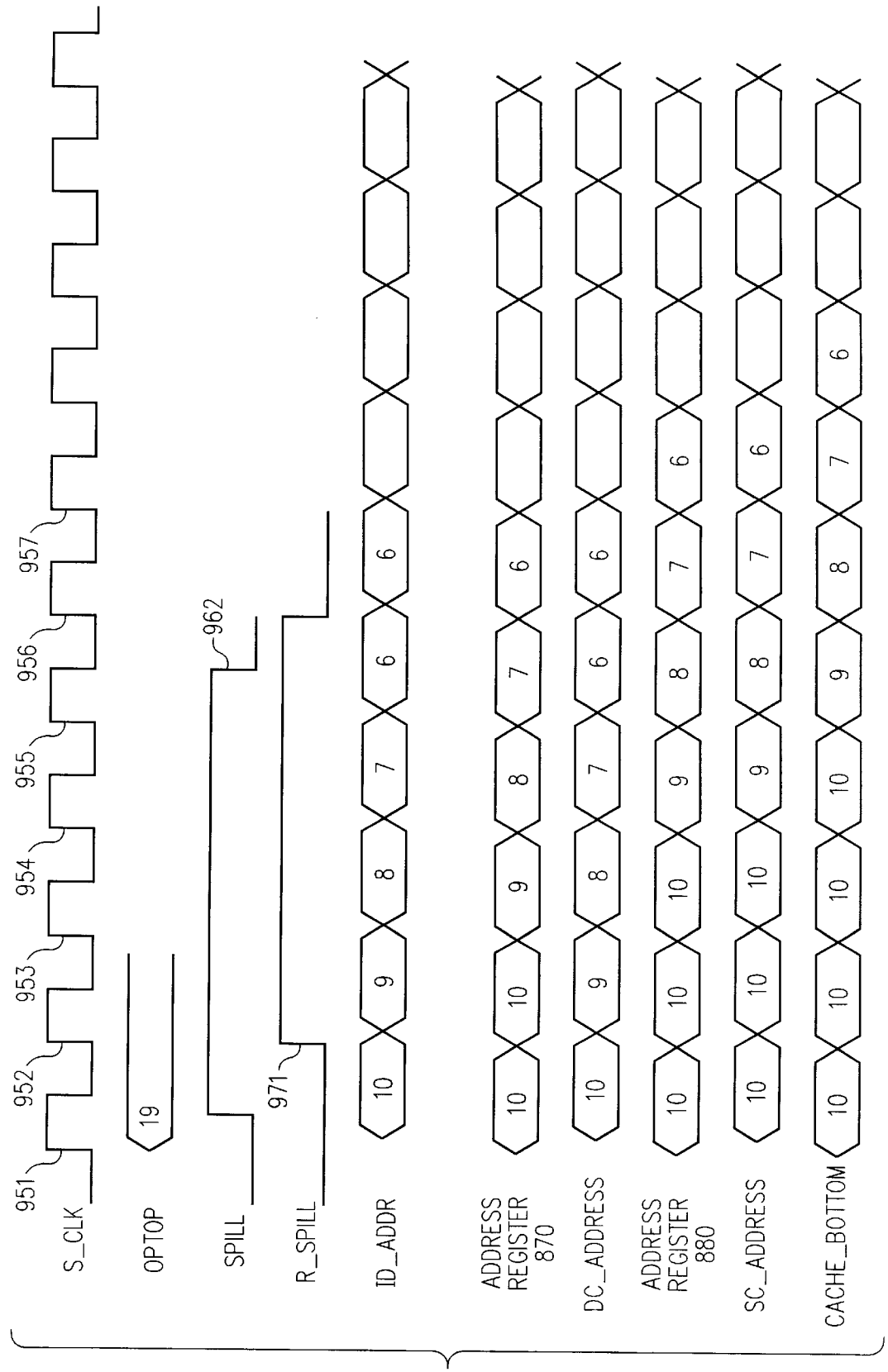
FIG. 9B is a timing diagram for the pipelined embodiment of a dribble manager unit of FIG. 8A.

FIG. 9B shows a timing diagram for the circuit of FIGS. 8A and 8C for a fill operation. The values in FIG. 9B represent the lower six bits of CACHE_BOTTOM, pointer OPTOP, and the various address values. As explained above, during a fill operation address multiplexer 865 outputs address I/D_ADDR from INC/DEC circuit 860; memory mux 875 outputs address I/D_ADDR from INC/DEC circuit 860; stack cache multiplexer 885 outputs the value from address register 880, and cache bottom multiplexer 805 outputs the address from address register 880. Thus, the simplified circuit of FIG. 8C may help to clarify the timing diagram of FIG. 9B. For the timing diagram of FIG. 9B, pointer CACHE_BOTTOM starts with a value of 10, pointer OPTOP reaches a value of 19 at active (rising) edge 951 of system clock signal S_CLK, and cache low threshold register contains a value of 10. After pointer OPTOP reaches 19, the number of used registers USED from Modulo SCS subtractor 810 is 9. Therefore, comparator 660 drives fill signal FILL to the fill logic level (logic high in FIG. 9B). At active edge 952, spill/fill register 850 drives registered fill signal R_FILL to the fill logic level (logic high). While registered fill signal R_FILL is at the fill logic level (logic high), INC/DEC circuit 860 decrements the address from address register 870. Furthermore, data cache unit 160 is given a read signal during every clock cycle registered fill signal R_FILL is at the fill logic level. Similarly, stack cache 255 is given a write signal two clock cycles after the read signal to data cache unit 160. However, if the requested data word is not in data cache unit 160, fill control unit 394 freezes address pipeline 845 and waits until the requested data is retrieved from slow memory unit 190.

After rising edge 971 of registered fill signal R_FILL, INC/DEC circuit 860 subtracts one from the output address in address register 870. Thus during clock period 952-P address ID_ADDR is 9. Since address register 870 is synchronized with system clock signal S_CLK, the contents of address register 870 transition to 9 after active (rising) edge 953. Since the output address in address register 870 serves as the input signal of INC/DEC circuit 860, INC/DEC circuit 860 and address register 870 are decremented every clock cycle that registered fill signal R_FILL is at the fill logic level. After a small propagation delay address I/D_ADDR is sent to data cache unit 160 (DC_ADDR).

Address register 880, which is also synchronized to system clock signal S_CLK, transitions to 9 after active (rising) edge 954 of system clock signal S_CLK. Thus stack cache 255 receives address SC_ADDR of 9 during clock period 954-P. The contents of cache bottom register 620, which is also synchronized to system clock signal S_CLK, transitions to 9 after rising edge 955. After the transition of cache bottom register 620, the number of used registers USED becomes 10, thus fill signal FILL transitions out of the fill logic level. Registered fill signal FILL transitions out of the fill logic level after active (rising) edge 956 of clock signal S_CLK.

In the example of FIG. 9B, registered fill signal R_FILL is at the fill logic level for four clock cycles. Therefore, four data words from data cache unit 160 are transferred to stack cache 255. In general, if the number of used data registers USED is less than the contents of cache low threshold register 830 by N, N+3 data words are transferred from data cache unit 160 to stack cache 255. Furthermore, while dribble manager unit 251 is filling words from data cache unit 160, stack-based computing system 100 may be popping words off of stack 180, thus pointer OPTOP can be decreased during a fill operation which may increase the number of words filled. For example if pointer OPTOP is updated to be 18 during clock period 954-P, registered fill signal R_FILL would remain at the fill logic level until active (rising) edge 957 of system clock signal S_CLK.

Some embodiments of stack cache management unit 150 are used with stack-based computing systems which may allocate or deallocate large blocks of data in stack 180. For example, stack-based computing system 100 may use invoke a method and need to allocate a block a memory for the method. Conversely, if a method completes operation, the memory for the method is deallocated and removed from stack 180. In addition some stack-based computing systems may use context switching between methods, during a context switch data from the current method must be saved since stack-based computing system 100 will context switch back to the current method at a later-time.

Most embodiments of stack-based computing system 100 allocates memory in stack cache 180 by programming a new value into OPTOP register 801. The appropriate data words are then written to stack 180 by stack-based computing system 100. Method invocation for large method calls can cause an overflow in stack cache management unit 150, i.e., if the number of used data words USED is larger than the capacity of stack cache memory circuit 310. For example, if stack cache memory circuit has a capacity of 64 data words, pointer CACHE_BOTTOM is 510 (using pointer CACHE_BOTTOM as a full-length memory address pointer), and pointer OPTOP is 540, when stack-based computing system 100 invokes a method requiring 40 data words, stack-based computing system would write a new pointer OPTOP value of 580 into optop register 801. Subtractor 810 (FIG. 8A) or stack cache status circuit 610 (FIG. 6) would compute the number of used data words USED as 70. Since the number of used data words USED is greater than the capacity of stack cache memory circuit 310, an overflow has occurred in stack cache management unit 150. In some embodiments of stack cache management unit 150, an overflow threshold is used to determine when an overflow occurs, i.e., an overflow occurs if the number of used data words USED is greater than the overflow threshold. For example, some embodiments of stack cache management unit 150 guarantee at least two empty data words in stack cache 255 and therefore use an overflow threshold two less than the capacity of stack cache memory circuit 310.

During an overflow situation, stack cache management unit 150 suspends operation of stack cache 255 and activates a state machine to store the valid data in stack cache memory circuit 310 prior to the overflow. After the data are saved, stack cache management unit 150 sets the various pointers of stack cache management unit 150 based on the new value of OPTOP and resumes operation of stack cache 255.

An underflow condition occurs if the number of used data words USED is less than zero. Typically, underflows occur when pointer OPTOP is less than pointer CACHE_BOTTOM.

However, in embodiments of dribble management unit 251 using a stack cache memory circuit 310 as a circular buffer, the arithmetic value of pointer OPTOP may be less than the arithmetic value of pointer CACHE_BOTTOM when the number of used data words USED is greater than zero. Therefore, embodiments of stack management unit 150 which do not use full-length memory address pointers for pointer OPTOP and pointer CACHE_BOTTOM may receive an underflow signal U_F (FIG. 10) directly from stack-based computing system 100.

Other embodiments may generate underflow signal U_F with subtractor 810 (FIG. 8A) or stack cache status circuit 610 (FIG. 6). Specifically, if an underflow condition occurs underflow signal U_F is driven to an underflow logic level, typically logic high; otherwise, underflow signal U_F is driven to a no underflow logic level, typically logic low.

A common cause of underflow condition occurs when a large method completes execution. Typically the data used by the method are no longer needed so pointer OPTOP is moved by stack-based computing system 100 directly to the first valid data word of the previous method. If the completed method was larger than the capacity of stack cache memory circuit 310 an underflow condition occurs.

Figure 10:
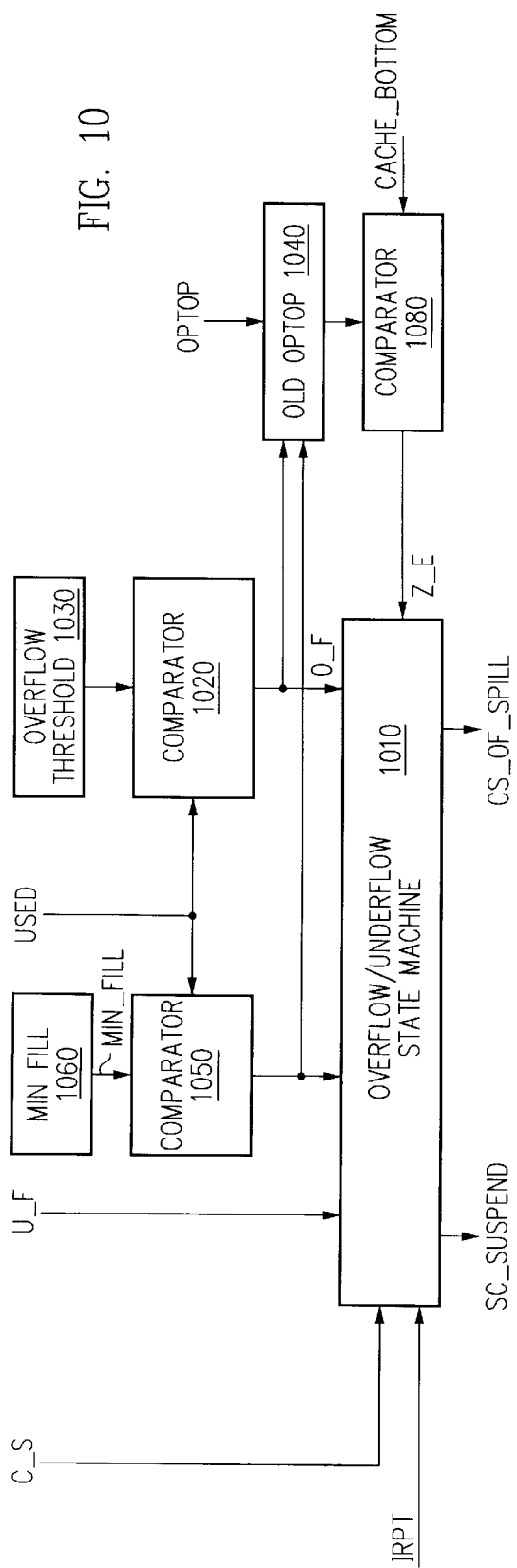
FIG. 10 illustrates a block diagram of an overflow/underflow control unit in accordance with this invention.

In most underflow conditions the previously valid data between pointer CACHE_BOTTOM and pointer OPTOP prior to the underflow can be discarded. However, some underflow conditions are caused by context switching between methods. For example, if stack-based computing system 100 switches from a current method to a previous method the data from the current method must be retained so that stack-based computing system 100 can context switch back to the current method. During the context switch, the previous method frame should reside at the top of the stack, therefore, stack-based computing system resets pointer OPTOP to the last valid data word of the previous method. If the current method is larger than the capacity of stack cache memory circuit 310, an underflow condition occurs. In the embodiment of FIG. 10, overflow/underflow state machine 1010 receives context switch signal C_S from stack-based computing system 100 to indicate whether a context switch is occurring.

During an underflow, dribble manager unit 251 suspends operation of stack cache 255 so that stack-based computing system 100 cannot access stack cache 255 until after the underflow condition is resolved. If no context switch is occurring, pointer CACHE_BOTTOM is set equal to the new value of pointer OPTOP. In some embodiments, dribble manager unit 251 guarantees a minimum number MIN_FILL of entries in stack cache 255. In these embodiments, dribble manager unit 251 suspends operation stack cache 255 until fill control unit 394 fills minimum number MIN_FILL words into stack cache memory circuit 310.

If an underflow occurs during a context switch, the data words between pointer CACHE_BOTTOM and the old value of pointer OPTOP must be stored. Therefore, overflow/underflow unit 396 activates spill control unit 398 to executes spills as described above, until all the data words in stack cache memory circuit 310 from pointer CACHE_BOTTOM to the old value of pointer OPTOP are saved. After the data words are saved, pointer CACHE_BOTTOM is set to the new value of pointer OPTOP. If minimum number MIN_FILL of entries is required in stack cache memory circuit 310, overflow/underflow unit 396 activates fill control unit 394 to executes fills as explained above.

FIG. 10 shows one embodiment of overflow/underflow control unit 396. A context switch signal C_S from stack-based computing system 100 notifies overflow/underflow state machine 1010 whether a context switch is occurring. Specifically, if a context switch is occurring, stack-based computing system 100 drives context switch signal C_S to a context switch logic level, typically logic high; otherwise, stack-based computing system 100 drives context switch signal C_S to a non-context switch logic level, typically logic low.

An underflow signal U_F (as explained above) indicates whether an underflow condition exists. A comparator 1020 compares the number of used data words USED from subtractor 810 (FIG. 8A) or stack cache status circuit 610 (FIG. 6) with the overflow threshold from overflow threshold register 1030. If the number of used data words USED is greater than the overflow threshold, comparator 1020 drives overflow signal O_F to an overflow logic level, typically logic high; otherwise, comparator 1020 drives overflow signal O_F to a no overflow logic level, typically logic low. A min fill register 1060 contains the minimum number MIN_FILL of data words required in stack cache memory circuit to resume normal stack cache operations. Comparator 1050 compares the number of used data words USED with the minimum number MIN_FILL of data words required in stack cache memory circuit 310 to resume normal stack cache operations. Minimum number MIN_FILL can be stored in a min fill register 1060 or hard wired into comparator 1050.

Comparator 1050 drives the result of the comparison to overflow/underflow state machine 1010. An old optop register 1040 stores the value of pointer OPTOP prior to an overflow or underflow condition. Specifically in one embodiment, old optop register 1040 stores pointer OPTOP every clock cycle until either overflow signal O_F is in the overflow logic level or underflow signal U_F is in the underflow logic level. Old optop register 1040 drives the old optop value to comparator 1080. Comparator 1080 compares the old optop value from old optop register 1040 with pointer CACHE_BOTTOM to generate a zero entry signal Z_E to overflow/underflow state machine 1010.

Specifically, if the value in old optop register 1040 is equal to pointer CACHE_BOTTOM, spill control unit 394 has finished spilling all the data words that needed to be saved due to the overflow or context switched underflow. Therefore, when pointer CACHE_BOTTOM is equal to the value of old optop register 1040, comparator 1080 drives a zero entry logic level, typically logic high on zero entry signal Z_E. Some embodiments of stack cache management unit 150 do not contain old optop register 1040 or comparator 1080. These embodiments receive zero entry signal Z_E directly from stack-based computing system 100.

Figure 11:
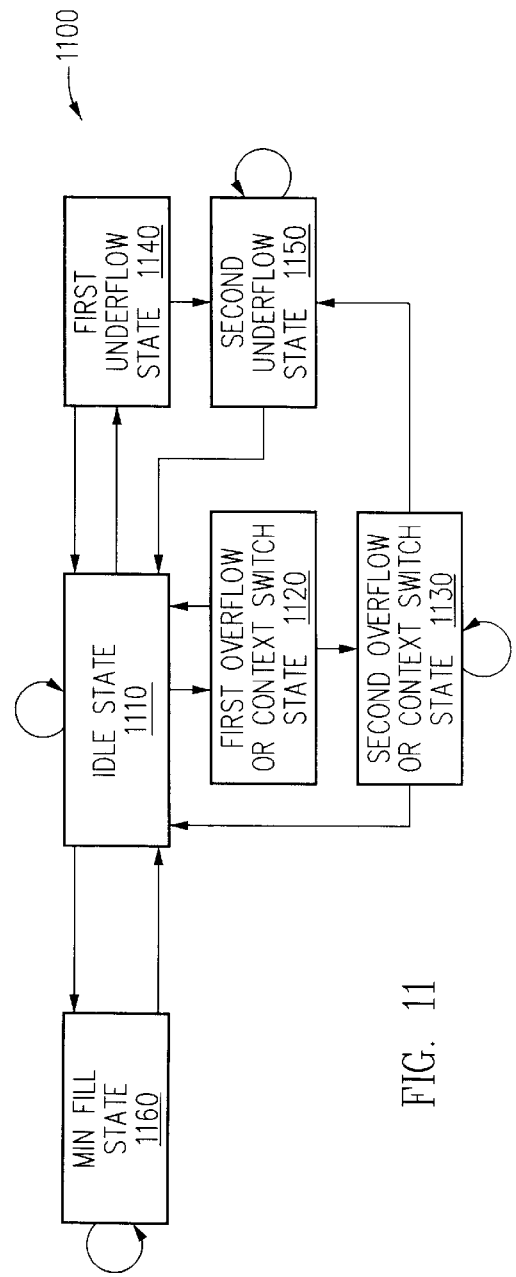
FIG. 11 illustrates a state diagram for an overflow/underflow control unit in accordance with this invention.

The operation of the embodiment of overflow/underflow unit 396 in FIG. 10 is explained with reference to a state diagram 1100 in FIG. 11 for overflow/underflow state machine 1010. Overflow/underflow state machine 1010 is in idle state 1110 until an overflow condition or an underflow condition occurs. Overflow/underflow state machine 1010 leaves idle state 1110 if an underflow condition exist, an overflow conditions exists, or the number of used data words USED is less than minimum number MIN_FILL. Overflow/underflow state machine 1010 behaves identically for an underflow during a context switch as overflow/underflow state machine 1010 behaves for an overflow. In addition during an overflow whether a context switch is occurring is irrelevant to overflow/underflow state machine 1010.

When an underflow without a context switch occurs, overflow/underflow state machine 1010 transitions to first underflow state 1140 and drives a suspend logic level on stack cache suspend signal SC_SUSPEND. In addition cache bottom multiplexer 805 is configured to allow address lines 877 to program cache bottom register 620 to be equal to optop pointer 801. Specifically, overflow/underflow state machine 1010 transitions to first underflow state 1140 if underflow signal is in the underflow logic level and context switch signal C_S is not in the context switch logic level.

From first underflow state 1150, overflow/underflow state machine 1010 transitions to idle state 1110 if stack-based computing system 100 drives an interrupt logic level on interrupt signal IRPT. Otherwise, overflow/underflow state machine 1010 transitions to second underflow state 1150 and configures cache bottom multiplexer 805 to drive the value of address register 880 to cache bottom register 620. Since pointer OPTOP and pointer CACHE_BOTTOM are equal fill control unit 398 fills stack cache memory circuit 310 from data cache unit 160. Overflow/underflow state machine 1010 remains in second underflow state 1150 until fill control unit 398 transfers minimum number MIN_FILL data words into stack cache memory circuit 310 or stack-based computing system drives an interrupt logic level on interrupt signal IRPT. Overflow/underflow state machine 1010 then transitions to idle state 1110 and drives a resume logic level on stack cache suspend signal SC_SUSPEND to resume normal operation of stack cache 255 and allow stack-based computing system 100 access to stack cache 255.

If overflow signal O_F is in the overflow logic level, which indicates an overflow has occurred, or if underflow signal U_F is in the underflow logic level and context switch signal C_S is in the context switch logic level, which indicates an underflow during a context switch, overflow/underflow state machine 1010 transitions to first overflow or context switch state 1120, drives a suspend logic level on stack cache suspend signal SC_SUSPEND, and suppresses fill control unit 398 from performing any fills from data cache unit 160.

Overflow/underflow unit 396 can be used with the embodiment of dribble management unit 251 of FIG. 8A by modifying spill/fill register 850 so that registered fill signal R_FILL is not driven to a fill logic level if overflow/underflow state machine 1010 is in either first overflow or context switch state 1120 or second overflow or context switch state 1130. From first overflow or context switch state 1120, overflow/underflow state machine 1010 transitions to idle state 1110 if stack-based computing system 100 drives an interrupt logic level on interrupt signal IRPT. Otherwise, overflow/underflow state machine 1010 transitions to second overflow context switch state 1130 and causes dribble manager unit 251 to spill data from stack cache 255 to data cache unit 160. Specifically, overflow/underflow state machine 1010 drives a spill active state on context switch/overflow spill signal CS_OF_SPILL.

Overflow/underflow unit 396 can be used with the embodiment of dribble management unit 251 of FIG. 8A by modifying spill/fill register 850 to drive a spill logic level on registered spill signal R_SPILL when spill signal SPILL or context switch/overflow spill signal CS_OF_SPILL is in the spill logic level. Overflow/underflow state machine 1010 remains in second overflow or context switch state 1130 until all the valid data entries before the overflow (or context switch underflow) in stack cache memory circuit 310 are copied to stack 180 in slow memory unit 190 or until stack-based computing system 100 interrupts overflow/underflow state machine 1010. Specifically, if all the valid data words are saved as indicated by a zero entry logic level on zero entry signal Z_E, overflow/underflow state machine 1010 transitions to second underflow state 1150, drives context switch/overflow spill signal CS_OF_SPILL out of the spill logic level, configures cache bottom multiplexer 805 to program pointer CACHE_BOTTOM to equal pointer OPTOP for one cycle, and proceeds as described above for second underflow state 1150.

If the number of used data words USED is less than minimum number MIN_FILL, overflow/underflow state machine 1010 transitions to min fill state 1160 and activates fill control unit 394. Overflow/underflow unit 396 can be used with the embodiment of dribble management unit 251 of FIG. 8A by modifying spill/fill register 850 to drive a fill logic level on registered fill signal R_FILL when overflow/underflow state machine 1010 is in min fill state 1160.

Figure 12:
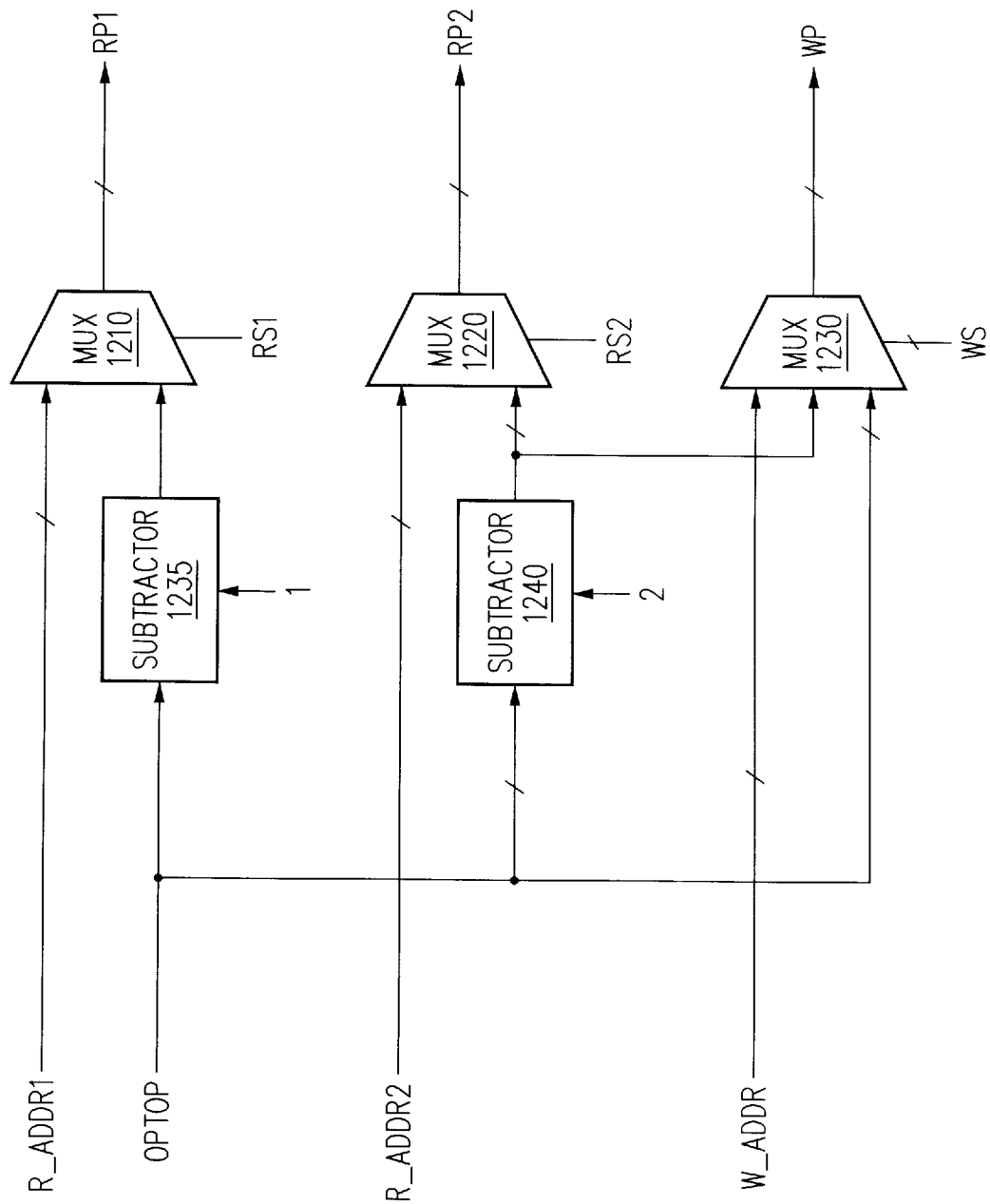
FIG. 12 illustrates a block diagram of a portion of an embodiment of a dribble manager unit in accordance with this invention.

As stated above, in one embodiment of stack cache 255, stack-based computing system 100 accesses stack cache memory circuit 310 (FIG. 3) through write port 330, read port 340 and read port 350. Stack control unit 252 generates pointers for write port 330, read port 340, and read port 350 based on the requests of stack-based computing system 100. FIG. 12 shows a circuit to generate pointers for a typical operation which reads two data words from stack cache 255 and writes one data word to stack cache 255. The most common stack manipulation for a stack-based computing system is to pop the top two data words off of the stack and to push a data word onto the top of the stack. Therefore, the circuit of FIG. 12 is configured to be able to provide read pointers to the value of pointer OPTOP minus one and the value of pointer OPTOP minus two, and a write pointer to the current value of OPTOP minus two for embodiments where pointer OPTOP points to the first free register or data word in stack cache memory circuit 310. For embodiments in which pointer OPTOP is not a full length memory address pointer, modulo subtraction should be used.

Multiplexer (MUX) 1210 drives a read pointer RP1 for read port 340. Subtractor 1235 subtracts one from the value of pointer OPTOP and drives the resulting value to multiplexer 1210. A select line RS1 controlled by stack-based computing system 100 determines whether multiplexer 1210 drives the value from subtractor 1240 or a read address R_ADDR1 as provided by stack-based computing system 100.

Multiplexer 1220 provides a read pointer RP2 for read port 350. Subtractor 1240 subtracts two from the value of pointer OPTOP and drives the resulting value to multiplexer 1220. A select line RS2 controlled by stack-based computing system 100 determines whether multiplexer 1220 drives the value from subtractor 1240, or a read address R_ADDR2 as provided by stack-based computing system 100.

Multiplexer 1230 provides a write pointer WP for write port 330. Select lines WS controlled by stack-based computing system 100 determines whether multiplexer 1230 drives the value from subtractor 1240, pointer OPTOP, or a write address W_ADDR as provided by stack-based computing system 100.

Figure 13:
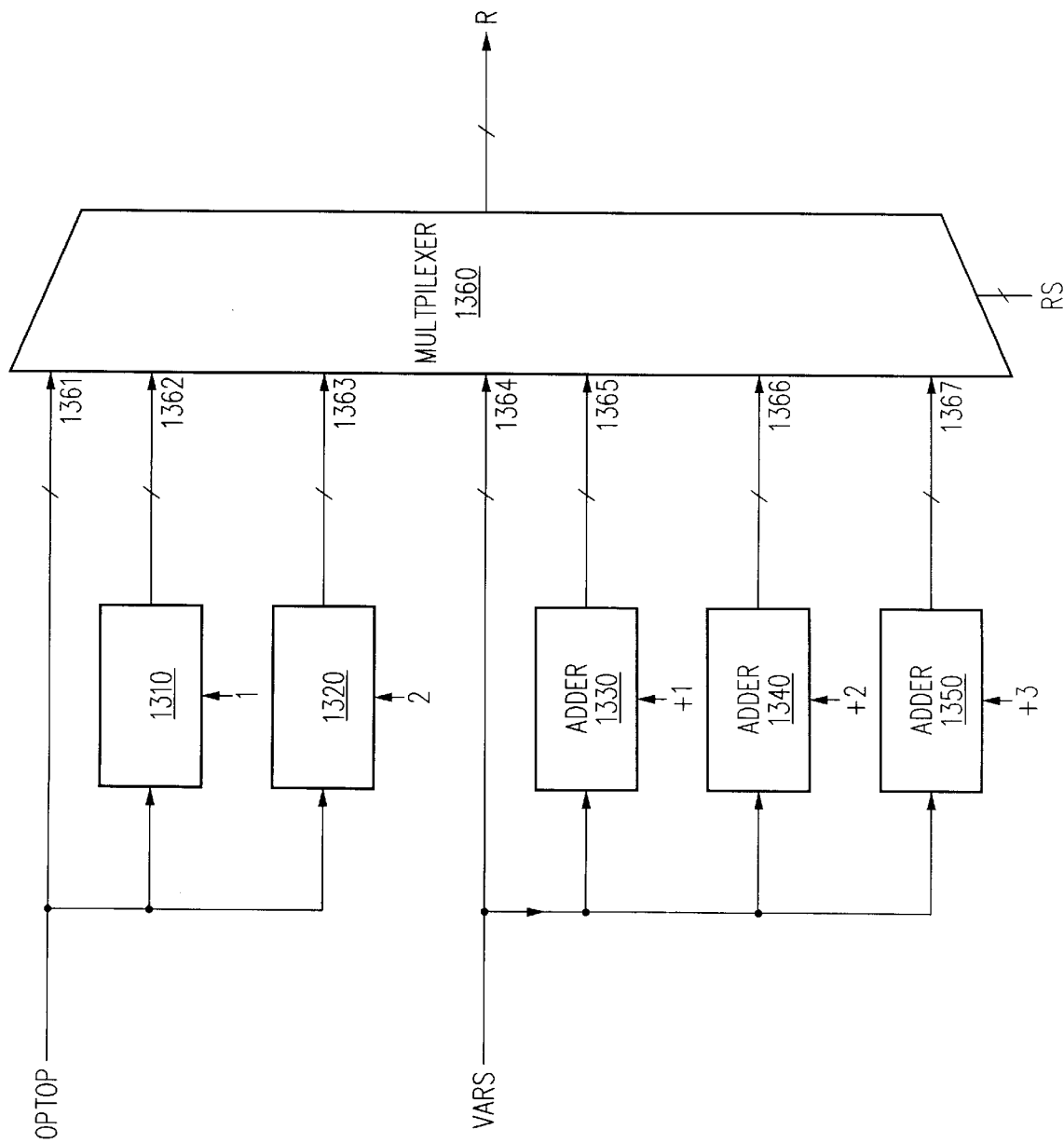
FIG. 13 illustrates a pointer generation circuit for one embodiment of a stack cache in accordance with this invention.

FIG. 13 shows a circuit that generates a read pointer R for read port 340 or read port 350 in embodiments allowing accessing stack cache memory circuit using pointer VARS. Multiplexer 1360 drives read pointer R to one of several input values received on input ports 1361 to 1367 as determined by selection signals RS. Selection signals RS are controlled by stack-based computing system 100. The value of pointer OPTOP is driven to input port 1361. Subtractor 1310 drives the value of pointer OPTOP minus one to input port 1362. Subtractor 1310 drives the value of pointer OPTOP minus two to input port 1363. The value of pointer VARS is driven to input port 1364. Adder 1330 drives the sum of the value of pointer VARS with one to input port 1365. Adder 1340 drives the sum of the value of pointer VARS with two to input port 1366. Adder 1350 drives the sum of the value of pointer VARS with three to input port 1363. Other embodiments may provide other values to the input ports of multiplexer 1360.

Thus, by using the stack cache according to the principles of the invention, a dribbling management unit can efficiently control transfers between the stack cache and the stack. Specifically, the dribbling management unit is able to transfer data out of the stack cache to make room for additional data as necessary and transfer data into the stack cache as room becomes available transparently to the stack-based computing system using the stack cache management unit. Furthermore, some embodiments of dribbling management unit rectify overflow and underflow conditions to facilitate method invocation and return.

The various embodiments of the structure and method of this invention that are described above are illustrative only of the principles of this invention and are not intended to limit the scope of the invention to the particular embodiments described. In view of this disclosure, those skilled-in-the-art can define other memory circuits, registers, counters, stack-based computing systems, dribble management units, fill control units, spill control units, overflow/underflow control units, read ports, write ports, and use these alternative features to create a method or system of stack caching according to the principles of this invention.

What is claimed is:

1. An address pipelining method for use in caching a portion of a stack in a stack cache having a plurality of memory locations, an optop pointer pointed at a top memory location of said stack cache, and a bottom pointer pointed at a bottom memory location of said stack cache, said method comprising:

writing a new data word for said stack at said top memory location of said stack cache, wherein said stack cache is in a first memory unit;

incrementing said optop pointer;

copying said bottom pointer as a first address to a first address register coupled to said stack and to said stack cache, wherein said stack is in a second memory unit different from said first memory unit; and spilling a plurality of data words from said stack cache in said first memory unit to said stack in said second memory unit if a spill condition exists.

2. The method of claim 1, further comprising detecting a spill condition.

3. The method of claim 2, wherein said detecting a spill condition further comprises:

calculating a number of used data words;

comparing said number of used data words with a stack cache high threshold; and generating a spill signal indicative of whether a spill condition exits.

4. The method of claim 3, wherein said detecting a spill condition further comprises registering said spill signal.

5. The method of claim 2 wherein said detecting said spill condition comprises:

comparing said optop pointer to a high water mark.

6. The method of claim 5 further comprising:

incrementing said high water mark if said spill condition exists.

7. The method of claim 1, further comprising copying said first address to a second register.

8. The method of claim 1, wherein said spilling a plurality of data words from said stack cache to said stack if a spill condition exists further comprises:

driving said first address to said stack and said stack cache;

decrementing said first address to generate a second address; and storing said second address in said first address register.

9. The method of claim 8, wherein said spilling a plurality of data words from said stack cache to said stack if a spill condition exists further comprises:

transferring a data word of said plurality of data words at said first address of said stack cache to said stack; and equating said bottom pointer to said second address.

10. The method of claim 9, wherein said spilling a plurality of data words from said stack cache to said stack if a spill condition exists further comprises driving said second address to said stack and said stack cache.

11. The method of claim 1, wherein said spilling a plurality of data words from said stack cache to said stack if a spill condition exists further comprises:

driving an address in said first address register to said stack and said stack cache;

decrementing said address in said first address register to produce a decremented address; and storing said decremented address in said first address register.

12. The method of claim 11, wherein said spilling a plurality of data words from said stack cache to said stack if a spill condition exists further comprises:

transferring a data word of said plurality of data words at said address in said stack cache to said stack; and equating said bottom pointer to said address.

13. The method of claim 12, wherein said driving an address in said first address register to said stack and said stack cache;

said decrementing said address in said first address register to produce a decremented address;

said storing said decremented address in said first address register;

said transferring a data word at said address in said stack cache to said stack; and equating said bottom pointer to said address are repeated until said spill condition does not exist.

14. The method of claim 1 wherein said second memory unit includes a data cache.

15. An address pipelining method for use in caching a portion of a stack in a stack cache having a plurality of memory locations, an optop pointer pointed at a top memory location of said stack cache, and a bottom pointer pointed at a bottom memory location of said stack cache, said method comprising:

reading a top data word from said stack in a first memory unit;

decrementing said optop pointer;

copying said bottom pointer as a first address to a first address register coupled to said stack and to said stack cache, wherein said stack cache is in a second memory unit different from said first memory unit; and filling a plurality of data words from said stack in said first memory unit to said stack cache in said second memory unit if a fill condition exists.

16. The method of claim 15, further comprising detecting a fill condition.

17. The method of claim 16, wherein said detecting a fill condition further comprises:

calculating a number of used data words;

comparing said number of used data words with a stack cache low threshold; and generating a fill signal indicative of whether a fill condition exits.

18. The method of claim 17, wherein said detecting a fill condition further comprises registering said fill signal.

19. The method of claim 16 wherein said determining if said fill condition exists comprises:

comparing said optop pointer to a low water mark.

20. The method of claim 19 further comprising:

decrementing said low water mark if said fill condition exists.

21. The method of claim 15, further comprising copying said first address to a second register.

22. The method of claim 21, wherein said filling a plurality of data words from said stack to said stack cache if a fill condition exists further comprises:

decrementing said first address to generate a second address;

storing said second address in said first address register;

driving said first address to said stack; and driving said second address to said stack cache.

23. The method of claim 22, wherein said filling a plurality of data words from said stack to said stack cache if a fill condition exists further comprises:

transferring a data word at said first address in said stack to said stack cache at said second address; and equating said bottom pointer to said second address.

24. The method of claim 15, wherein said filling a plurality of data words from said stack to said stack cache if a fill condition exists further comprises:

copying an address in said first address register to a second address register;

decrementing said address in said first address register to produce a decremented address;

storing said decremented address in said first address register;

driving said address in said first address register to said stack;

driving an address in said second address register to said stack cache;

decrementing said address in said first address register to produce a decremented address; and storing said decremented address in said first address register.

25. The method of claim 24, wherein said filling a plurality of data words from said stack to said stack cache if a fill condition exists further comprises:

transferring a data word in said stack at said address in said first address register to said stack cache; and equating said bottom pointer to said address in said second address register.

26. The method of claim 25, wherein said copying an address in said first address register to a second address register;

said decrementing said address in said first address register to produce a decremented address;

said storing said decremented address in said first address register;

said driving said address in said first address register to said stack;

said driving an address in said second address register to said stack cache;

said decrementing said address in said first address register to produce a decremented address;

said storing said decremented address in said first address register;

said transferring a data word in said stack at said address in said first address register to said stack cache; and said equating said bottom pointer to said address in said second address register are repeated until said fill condition does not exist.

27. The method of claim 15 wherein said first memory unit includes a data cache.

* * * * *